US008264366B2

(12) United States Patent
Chamarti et al.

(10) Patent No.: US 8,264,366 B2
(45) Date of Patent: Sep. 11, 2012

(54) COMPONENTS, SYSTEMS, AND METHODS FOR ASSOCIATING SENSOR DATA WITH COMPONENT LOCATION

(75) Inventors: Aravind Chamarti, Painted Post, NY (US); John David Downie, Painted Post, NY (US); James Scott Sutherland, Corning, NY (US); Richard Edward Wagner, Painted Post, NY (US); Dale Alan Webb, Corning, NY (US); Matthew Scott Whiting, Lawrenceville, PA (US)

(73) Assignee: Corning Incorporated, Corning, NY (US)

( * ) Notice: Subject to any disclaimer, the term of this patent is extended or adjusted under 35 U.S.C. 154(b) by 776 days.

(21) Appl. No.: 12/415,343

(22) Filed: Mar. 31, 2009

(65) Prior Publication Data

US 2010/0245057 A1      Sep. 30, 2010

(51) Int. Cl.
*G08B 21/00* (2006.01)

(52) U.S. Cl. ............... 340/686.4; 340/686.2; 340/10.42; 340/572.1; 439/488; 439/489; 439/490; 709/224; 709/250

(58) Field of Classification Search .......... 439/488–490; 709/224, 250; 438/5, 6, 14
See application file for complete search history.

(56) References Cited

U.S. PATENT DOCUMENTS

| | | | |
|---|---|---|---|
| 4,889,977 A | 12/1989 | Haydon | |
| 5,483,467 A | 1/1996 | Krupka et al. | |
| 5,528,222 A | 6/1996 | Moskowitz et al. | |
| 5,821,510 A | 10/1998 | Cohen et al. | |
| 5,910,776 A | 6/1999 | Black | |
| 5,914,862 A | 6/1999 | Ferguson et al. | |
| 5,995,006 A | 11/1999 | Walsh | |
| 6,002,331 A | 12/1999 | Laor | |
| 6,025,725 A | 2/2000 | Gershenfeld et al. | |
| 6,100,804 A | 8/2000 | Brady et al. | |
| 6,118,379 A | 9/2000 | Kodukula et al. | |
| 6,127,929 A | 10/2000 | Roz | |
| 6,133,835 A | 10/2000 | De Leeuw et al. | |
| 6,164,551 A | 12/2000 | Altwasser | |

(Continued)

FOREIGN PATENT DOCUMENTS

DE           19841738           3/2000

(Continued)

OTHER PUBLICATIONS

Patent Cooperation Treaty Form ISA/220, May 9, 2011, pp. 1-2.

*Primary Examiner* — Jennifer Mehmood
*Assistant Examiner* — Mark Rushing

(57) ABSTRACT

Components having one or more sensors adapted to provide sensor data relating to a condition(s) of the component are disclosed. The component is adapted to communicate with another mating component to associate sensor data with identity information of the mating component. The sensor and identity information can be communicated remotely including via radio-frequency communications employing RF identification devices (RFIDs). Location of the mating component can be determined using the identity information of the mating component. In this manner, the sensor data can be associated with the location of the mating component using the identity information in a "component-to-component" configuration to provide location-specific sensor data. Having the ability to localize sensor data to a specific location can assist in pinpointing areas where performance or other condition issues may exist in a component, a mating component, an article of manufacture associated with the components, and/or communication and/or transmissions lines coupled between components.

29 Claims, 18 Drawing Sheets

U.S. PATENT DOCUMENTS

| | | |
|---|---|---|
| 6,232,870 B1 | 5/2001 | Garber et al. |
| 6,424,263 B1 | 7/2002 | Lee et al. |
| 6,424,315 B1 | 7/2002 | Glenn et al. |
| 6,496,113 B2 | 12/2002 | Lee et al. |
| 6,496,382 B1 | 12/2002 | Ferguson et al. |
| 6,522,308 B1 | 2/2003 | Mathieu |
| 6,618,022 B2 | 9/2003 | Harvey |
| 6,693,513 B2 | 2/2004 | Tuttle |
| 6,784,802 B1 * | 8/2004 | Stanescu ............... 340/687 |
| 6,808,116 B1 | 10/2004 | Eslambolchi et al. |
| 6,829,427 B1 | 12/2004 | Becker |
| 6,847,586 B2 | 1/2005 | Chen |
| 6,847,856 B1 * | 1/2005 | Bohannon ................ 700/115 |
| 6,857,897 B2 | 2/2005 | Conn |
| 6,897,374 B2 | 5/2005 | Garber et al. |
| 6,898,368 B2 | 5/2005 | Colombo et al. |
| 6,899,626 B1 | 5/2005 | Luciano et al. |
| 6,915,050 B2 | 7/2005 | Koyasu et al. |
| 6,924,997 B2 | 8/2005 | Chen et al. |
| 6,968,994 B1 | 11/2005 | Ashwood Smith |
| 6,971,895 B2 | 12/2005 | Sago et al. |
| 6,973,243 B2 | 12/2005 | Koyasu et al. |
| 6,999,028 B2 | 2/2006 | Egbert |
| 7,014,100 B2 | 3/2006 | Zierolf |
| 7,061,366 B2 | 6/2006 | Bell et al. |
| 7,068,912 B1 | 6/2006 | Becker |
| 7,069,345 B2 | 6/2006 | Shteyn |
| 7,080,945 B2 | 7/2006 | Colombo et al. |
| 7,081,808 B2 | 7/2006 | Colombo et al. |
| 7,102,520 B2 | 9/2006 | Liu et al. |
| 7,151,455 B2 | 12/2006 | Lindsay et al. |
| 7,158,031 B2 | 1/2007 | Tuttle |
| 7,158,033 B2 | 1/2007 | Forster |
| 7,165,728 B2 | 1/2007 | Durrant et al. |
| 7,170,393 B2 | 1/2007 | Martin |
| 7,194,180 B2 | 3/2007 | Becker |
| 7,205,898 B2 | 4/2007 | Dixon et al. |
| 7,209,042 B2 | 4/2007 | Martin et al. |
| 7,210,858 B2 | 5/2007 | Sago et al. |
| 7,221,277 B2 | 5/2007 | Caron et al. |
| 7,224,278 B2 | 5/2007 | Phaneuf et al. |
| 7,224,280 B2 | 5/2007 | Ferguson et al. |
| 7,226,217 B1 | 6/2007 | Benton et al. |
| 7,233,250 B2 | 6/2007 | Forster |
| 7,243,837 B2 | 7/2007 | Durrant et al. |
| 7,249,705 B2 | 7/2007 | Dudley |
| 7,253,735 B2 | 8/2007 | Gengel et al. |
| 7,265,674 B2 | 9/2007 | Tuttle |
| 7,275,970 B2 | 10/2007 | Hoshina |
| 7,297,028 B2 | 11/2007 | Daikuhara et al. |
| 7,298,266 B2 | 11/2007 | Forster |
| 7,298,330 B2 | 11/2007 | Forster |
| 7,306,489 B2 | 12/2007 | Werthman et al. |
| 7,336,883 B2 | 2/2008 | Scholtz |
| 7,348,884 B2 | 3/2008 | Higham |
| 7,349,605 B2 | 3/2008 | Noonan et al. |
| 7,352,285 B2 | 4/2008 | Sakama et al. |
| 7,352,289 B1 | 4/2008 | Harris |
| 7,356,208 B2 | 4/2008 | Becker |
| 7,554,448 B2 | 6/2009 | Tomioka |
| 2002/0092347 A1 | 7/2002 | Niekerk et al. |
| 2003/0021580 A1 | 1/2003 | Matthews |
| 2003/0061393 A1 * | 3/2003 | Steegmans et al. .......... 709/250 |
| 2003/0179073 A1 | 9/2003 | Ghazarian |
| 2004/0041714 A1 | 3/2004 | Forster |
| 2004/0114879 A1 | 6/2004 | Hiereth et al. |
| 2004/0117515 A1 | 6/2004 | Sago et al. |
| 2004/0149736 A1 | 8/2004 | Clothier |
| 2004/0253874 A1 | 12/2004 | Plishner |
| 2005/0052287 A1 | 3/2005 | Whitesmith et al. |
| 2005/0068179 A1 | 3/2005 | Roesner |
| 2005/0076982 A1 | 4/2005 | Metcalf et al. |
| 2005/0093677 A1 | 5/2005 | Forster et al. |
| 2005/0215119 A1 | 9/2005 | Kaneko |
| 2005/0224585 A1 | 10/2005 | Durrant et al. |
| 2005/0232636 A1 | 10/2005 | Durrant et al. |
| 2005/0242950 A1 | 11/2005 | Lindsay et al. |
| 2005/0259930 A1 | 11/2005 | Elkins et al. |
| 2005/0285718 A1 | 12/2005 | Enguent |
| 2006/0006999 A1 | 1/2006 | Walczyk et al. |
| 2006/0015233 A1 | 1/2006 | Olsen, III et al. |
| 2006/0019540 A1 | 1/2006 | Werthman et al. |
| 2006/0044148 A1 | 3/2006 | Daniels et al. |
| 2006/0139149 A1 | 6/2006 | Faro et al. |
| 2006/0145863 A1 | 7/2006 | Martin et al. |
| 2006/0148279 A1 | 7/2006 | German et al. |
| 2006/0166546 A1 | 7/2006 | Ashizawa et al. |
| 2006/0232419 A1 | 10/2006 | Tomioka et al. |
| 2006/0233506 A1 | 10/2006 | Noonan et al. |
| 2006/0267737 A1 | 11/2006 | Colby |
| 2006/0267778 A1 | 11/2006 | Gengel et al. |
| 2007/0001807 A1 | 1/2007 | Malone et al. ............... 340/10.1 |
| 2007/0018787 A1 | 1/2007 | Martinez de Velasco Cortina et al. |
| 2007/0023525 A1 | 2/2007 | Son et al. |
| 2007/0057771 A1 | 3/2007 | Tomioka |
| 2007/0120684 A1 | 5/2007 | Utaka et al. |
| 2007/0152828 A1 | 7/2007 | Mohalik |
| 2007/0205897 A1 | 9/2007 | Forster |
| 2007/0205902 A1 | 9/2007 | Cote et al. |
| 2007/0216534 A1 | 9/2007 | Ferguson et al. |
| 2007/0236355 A1 | 10/2007 | Flaster et al. |
| 2007/0247284 A1 | 10/2007 | Martin et al. |
| 2007/0273507 A1 | 11/2007 | Burchell et al. ......... 340/539.27 |
| 2008/0030353 A1 | 2/2008 | O'Toole et al. |
| 2008/0048826 A1 | 2/2008 | Agrawal et al. |
| 2008/0100440 A1 | 5/2008 | Downie et al. |
| 2008/0100456 A1 * | 5/2008 | Downie et al. ............. 340/572.8 |
| 2008/0122641 A1 | 5/2008 | Amidi ........................ 340/632 |
| 2008/0240724 A1 | 10/2008 | Aguren |

FOREIGN PATENT DOCUMENTS

| | | |
|---|---|---|
| DE | 10249414 A1 | 5/2004 |
| EP | 1455550 A2 | 9/2004 |
| GB | 2371211 A | 7/2002 |
| JP | 03242795 | 10/1991 |
| JP | 2003148653 | 10/1991 |
| JP | 2002264617 | 9/2002 |
| JP | 2003172827 | 6/2003 |
| JP | 2003229215 | 8/2003 |
| JP | 2004039389 | 2/2004 |
| JP | 2004142500 | 5/2004 |
| JP | 2004152543 | 5/2004 |
| JP | 2004245963 | 9/2004 |
| JP | 2004247090 | 9/2004 |
| JP | 2004264901 | 9/2004 |
| JP | 2004265624 | 9/2004 |
| JP | 2004317737 | 11/2004 |
| JP | 2004349184 | 12/2004 |
| JP | 2005018175 | 1/2005 |
| JP | 2005033857 | 2/2005 |
| JP | 2005050581 | 2/2005 |
| JP | 2005084162 | 3/2005 |
| JP | 2005086901 | 3/2005 |
| JP | 2005087135 | 4/2005 |
| JP | 2005092107 | 4/2005 |
| JP | 2005134125 | 5/2005 |
| JP | 2005216698 | 8/2005 |
| JP | 2005302403 | 10/2005 |
| JP | 2005315980 | 11/2005 |
| JP | 2005339983 | 12/2005 |
| JP | 2006054118 | 2/2006 |
| JP | 2006245983 | 9/2006 |
| JP | 2006279650 | 10/2006 |
| JP | 2007087849 | 4/2007 |
| JP | 2007088957 | 4/2007 |
| JP | 2007158993 | 6/2007 |
| JP | 2007189774 | 7/2007 |
| JP | 2007221400 | 8/2007 |
| WO | 01/55991 A1 | 8/2001 |
| WO | 03098175 A1 | 11/2003 |
| WO | 2004030154 A2 | 4/2004 |
| WO | 2005069203 A2 | 7/2005 |
| WO | 2006058119 A1 | 6/2006 |
| WO | 2008000656 A1 | 1/2008 |

* cited by examiner

COMPONENTS, SYSTEMS, AND METHODS FOR ASSOCIATING SENSOR DATA WITH COMPONENT LOCATION

BACKGROUND

1. Field of the Disclosure

The field of the disclosure relates to a sensor included in a component for sensing information relating to or surrounding the component location. The component can be attached to an article of manufacture and configured to be mated with a mating component. The component may include radio-frequency (RF) communication capability for communicating information, including the sensed information.

2. Technical Background

Conditions surrounding or proximate to articles of manufacture can be important for a number of reasons. One example of such an article of manufacture includes electrical and fiber optic-based equipment used for data transmission. It may be important that equipment operate according to desired performance guidelines. For example, if equipment is used to establish voice connections and transmit voice data, strict Quality of Service (QoS) requirements must be met. As an example, voice switching equipment may be required to meet a QoS rating of no more than two hours of failure for every forty years of use. However, conditions surrounding the equipment may negatively affect equipment performance. Examples of such conditions include temperature, pressure, and air flow. Other articles of manufacture may also have requirements relating to performance that can be affected by surrounding conditions.

In this regard, sensors may be employed in areas in and around the articles of manufacture to detect conditions that can affect performance. The sensed condition information may then be reported. For example, the sensed condition information may be environmental and/or physical information. The sensed condition information may be used to alert service personnel when remedial measures are required to either reduce the risk of equipment failure or when equipment has failed for repair dispatch. The condition information may also be used to automatically shut down equipment operation and re-route data transmission. Further, monitoring and reporting of security-based conditions may also be desired to detect potential disturbances of equipment that may negatively affect desired operation. The condition information detected by the sensors can also be reported to surveillance systems, including both on-site and remote systems.

Although a sensor may detect and report surrounding conditions, the location of the sensor may be unknown and thus the location of the sensed information is unknown. If the sensor is attached to an article of manufacture, the sensed condition information may also not be able to be associated with a particular location when reported. The article of manufacture may be portable or removable. Further, conditions that can affect performance may be localized to a particular component of equipment rather than to the equipment as a whole. For example, a malfunctioning circuit or wire in one component of the equipment may be detected as an increase in temperature. The malfunctioning circuit or wire may be localized to a particular fixed component of the equipment, such as a socket or adapter. Further, a removable component, such as a plug or connector, connected to the fixed component may have the malfunction as opposed to the fixed component. In either case, the sensor may detect and report data indicative of conditions in a general area in which the malfunction is located. However, the location of the sensed information may not be precisely mapped to the malfunctioning component.

SUMMARY OF THE DETAILED DESCRIPTION

Embodiments disclosed in the detailed description include components having one or more sensors adapted to sense and provide localized sensor data. Having the ability to localize sensor data to a specific location rather than generalized areas or locations can assist in quickly pinpointing areas where performance or other condition issues may exist in components and equipment associated with components. In this regard, the components disclosed herein are adapted to communicate with a mating component. Sensor data from the one or more sensors can be associated with identity information of the mating component. The identity information of the mating component can be used to determine the location of the mating component, whether a fixed location or a relative location to another component or particular equipment. In this manner, the sensor data can be associated with the location of the mating component in a "component-to-component" configuration to provide location-specific sensor data. The components may be associated with any type of article of manufacture desired, including but not limited to equipment, including electrical and/or fiber optic equipment.

In certain disclosed embodiments, the component includes an integrated circuit (IC). The IC may be provided in the form of an IC chip. The component also includes one or more electrical leads coupled to the IC. One or more sensors are provided and adapted to communicate sensor data regarding environmental and/or physical conditions or information relating to and/or in proximity to the component. The IC is configured to communicate with a mating component when the one or more electrical leads are coupled to one or more electrical leads provided in the mating component. When connected, the communication between the component and the mating component allows the identity information of the component, the mating component, or both to be associated with the sensor data. In this manner, the identity information can be used to associate a specific location to the sensor data to provide location-specific sensor data. The specific location may be to a resolution down to centimeters (cm) scale as an example. The association of the sensor data with a location can be performed by the component or mating component, or a communication system coupled to the components, including a radio-frequency (RF) identification (RFID) reader and/or or component management system.

In certain embodiments, the IC is configured to communicate the sensor data over the one or more electrical leads to the mating component to associate the sensor data with the identity information of the component, the mating component, or both. In other embodiments, the IC is configured to receive the identity information of the mating component over the one or more electrical leads to associate the sensor data with the identity information of the mating component. In other embodiments, the IC is RFID-enabled and is coupled to an antenna to provide an RFID transponder. The information provided to the RFID transponder, including the sensor data, identity information, and any information received from the mating component, can be communicated to an RFID reader via RF communications. The RFID transponder may be an active, semi-passive, or passive device. Passive RFID transponder devices may be desired when providing a power supply is not desired or otherwise impractical due to cost or size limitations. Passive RFID devices can be powered by an interrogation signal transmitted by an RFID reader. RFID-enabled components are not required.

The components disclosed herein are adapted to associate sensor data with identity information of a component to provide location-specific sensor data. The components disclosed herein can be any type of component and for any type of article of manufacture, including equipment. For example, the component may be used to establish a connection with equipment. Examples include electrical or fiber optic components, an electrical plug or fiber optic connector, or an electrical socket or fiber optic adapter. The equipment adapted to be coupled or connected to the components can be any type of equipment, including but not limited to electrical and fiber optic equipment. The equipment or articles of manufacture can be located in equipment housings or racks and in range of RFID readers and associated systems.

The embodiments for associating location with sensor data to provide location-specific sensor data can be applied to any collection of articles that are physically arranged in close proximity with each other. Examples include, but are not limited to, RFID tags associated with electrical or optical network equipment, utility equipment and systems, power distribution systems, modular building structures that are mated together during construction, including but not limited to flooring, roofing, walls, and any other type of interconnection systems. Additional features and advantages of the embodiments will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the embodiments. The accompanying drawings are included to provide a further understanding of the embodiments, and are incorporated into and constitute a part of this specification. The drawings illustrate various embodiments of the embodiments and together with the description serve to explain the principles and operation of the embodiments.

DETAILED DESCRIPTION

Reference will now be made in detail to the embodiments, examples of which are illustrated in the accompanying drawings, in which some, but not all embodiments are shown. Indeed, the embodiments may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include components having one or more sensors adapted to sense and provide localized sensor data. Having the ability to localize sensor data to a specific location rather than generalized areas or locations can assist in quickly pinpointing areas where performance or other condition issues may exist in components and equipment associated with components. In this regard, the components disclosed herein are adapted to communicate with a mating component. Sensor data from the one or more sensors can be associated with identity information of the mating component. The identity information of the mating component can be used to determine the location of the mating component, whether a fixed location or a relative location to another component or particular equipment. In this manner, the sensor data can be associated with the location of the mating component in a "component-to-component" configuration to provide location-specific sensor data. The specific location may be to a resolution down to centimeters (cm) scale as an example. The association of the sensor data with a location can be performed by the component or mating component, or a communication system coupled to the components, including a radio-frequency (RF) identification (RFID) reader and/or component management system. The components may be associated with any type of article of manufacture desired, including but not limited to equipment, including electrical and/or fiber optic equipment.

Figure 1:
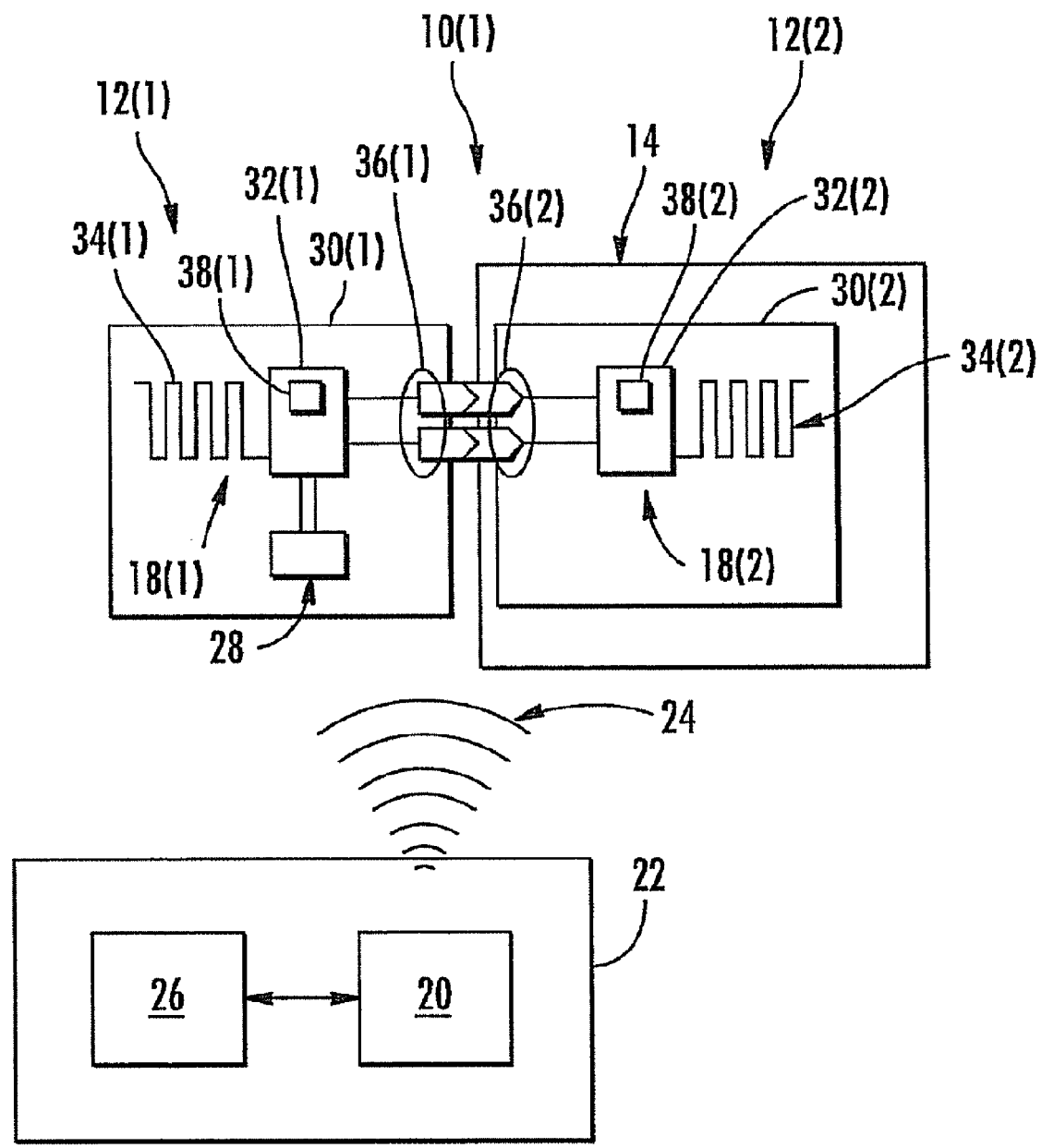
FIG. 1 is a schematic diagram of an exemplary component mating system configured to associate sensor data relating to a condition(s) of the components with identity information of a mating component.

FIG. 1 illustrates a first exemplary embodiment of a component mating system 10(1) where sensor data from a sensor associated with a component can be associated with the location of a component to provide location-specific sensor data. In this regard as illustrated in FIG. 1, two components 12(1), 12(2) are mated to each other. In this example, the component 12(1) is a removable component that is mated with a mating component 12(2). The mating component 12(2) is a fixed component in this embodiment, meaning that the mating component 12(2) is attached to an article of manufacture 14. The article of manufacture 14 may be equipment, including but not limited to electrical or fiber optic-based equipment. The component 12(1) may be attached to a cable or cord that is plugged into the fixed, mating component 12(2). Note that although this embodiment is discussed in terms of the component 12(1) mating with the mating component 12(2), these terms are used for convenience only. The mating component 12(2) could be considered to be the component and the component 12(1) considered to be the mating component. The term "mating component" is simply any component that can be connected, mated to or receive another component, or vice versa.

As further illustrated in FIG. 1, the component 12(1) includes an integrated sensor 28 configured to detect environmental and/or physical information relating to the component 12(1) and/or the surrounding area of the component 12(1) (referred to as "sensor data"). The sensor 28 can include any type of sensor that can sense environment and/or physical information or conditions surrounding the sensor 28. Examples will be discussed below. As will be discussed throughout this description, the sensor data can be used to detect information relating to the component 12(1). The sensor data can be communicated to other components or systems, including a mating component 12(2) and/or to an RFID reader 20. The sensor data can be used to troubleshoot or diagnose environmental and/or physical conditions that can affect performance, security, or other features of the component 12(1). The component 12(1) may be an electrical component, fiber optic component, or other type of component used to provide an interconnection between an article of manufacture 14. The article of manufacture 14 may be any type of equipment, including electrical and fiber optic equipment and used for any type of application.

Both the component 12(1) and mating component 12(2) are contained in respective component housings 30(1), 30(2). The component housings 30(1), 30(2) may be attached to or comprise articles of manufacture, equipment, or other components. The component housing 30(1) of the component 12(1) includes the sensor 28 and an integrated circuit (IC) in the form of an IC chip 32(1). The mating component 12(2) also contains an IC chip 32(2) in the component housing 30(2). The IC chips 32(1), 32(2) provide circuitry for enabling certain functionality and communication with each other as well as other systems or devices. In this embodiment, the IC chip 32(1) in the component 12(1) is also coupled to the sensor 28 to receive sensor data regarding the component 12(1) and/or the surrounding area. The IC chips 32(1), 32(2) may be entirely or partially located in the components 12(1), 12(2).

The IC chips 32(1), 32(2) may or may not be RFID-enabled. In this embodiment, the IC chips 32(1), 32(2) are RFID-enabled and may be referred to generally as IC chips or as an "RFID chip," "RFID-enabled chip," or "RFID-enabled IC chip." The RFID-enabled IC chips 32(1), 32(2) include respective associated RFID transponder circuitry which is coupled to respective antennas 34(1), 34(2) to provide RFID transponders 18(1), 18(2). As used herein, the term "RFID transponder" includes at least an RFID-enabled IC and an antenna. The RFID transponders 18(1), 18(2) allow for RF communications including to the RFID reader 20. The RFID transponders 18(1), 18(2) may employ passive, semi-passive, or active RFID-enabled IC chips 32(1), 32(2), and may be designed to respond and/or communicate at the frequency desired via respective antennas 34(1), 34(2). In this embodiment, the RFID transponders 18(1), 18(2) are passive devices. Passive RFID devices do not require their own power source. Power can be harvested from an interrogation signal 24 transmitted by the RFID reader 20 in the RFID reader system 22 and received by the antennas 34(1), 34(2). Thus, passive RFID devices may be desired when providing a power supply is not desired or otherwise impractical due to cost or size limitations. The antennas 34(1), 34(2) may be any type of antenna that is tuned to the desired reception and/or transmission frequency(s), including but not limited to a dipole and monopole antenna. The antennas 34(1), 34(2) can be external to or integrated in the IC chips 32(1), 32(2). In this embodiment, the sensor 28 can also be external to or integrated in the IC chip 32(1) or the component 12(1).

Also in this embodiment, both the component 12(1) and mating component 12(2) contain one or more electrical leads each coupled to their respective IC chips 32(1), 32(2). When the electrical leads 36(1), 36(2) come into electrical contact with each other as a result of a connection, a connection event occurs. In response, the IC chips 32(1), 32(2) of the components 12(1), 12(2), respectively, initiate communications with each other over the electrical leads 36(1), 36(2). Identity information regarding the identity of the component 12(1) and mating component 12(2) stored in memory 38(1), 38(2) provided in the IC chips 32(1), 32(2) of the RFID transponders 18(1), 18(2) can be exchanged and stored to signify the connection of the component 12(1) with the mating component 12(2). Either or both the component 12(1) and the mating component 12(2) can also communicate their own identity information as well as exchanged identity information with the other component 12(2), 12(1), respectively, to the RFID reader 20. The components 12(1), 12(2) may communicate other information stored in memory, such as serial number, type of connector, cable type, manufacturer, manufacturing date, installation date, location, lot number, performance parameters (such as attenuation measured during installation), identification of what is at other end of the cable, etc. Such information could be preloaded on the memory 38(1), 38(2) of the RFID transponders 18(1), 18(2) at manufacture or upon installation via the RFID reader 20.

The RFID reader system 22 coupled to the RFID reader 20 receives identity information pairs signifying component(s) 12(1) mated to mating component(s) 12(2) within the range of the RFID reader 20 and processes the information in a component management system 26. The component management system 26 may include control systems and related software for processing the information received from the components 12 to perform a number of tasks. These tasks include, but are not limited to, recording the identity information pairs, providing identity information pairs information to a technician, recording which components 12 are not mated, and providing other troubleshooting and diagnostic information, as will be described in greater detail below. Furthermore, the component management system 26, and any associated database and/or processing element, includes stored information relating to one or more RFID transponders 18(1), 18(2) in order to facilitate identification, mapping, or other processing of the information received from one or more RFID transponders 18(1), 18(2). More specifically, the RFID reader 20 includes information that correlates a unique identification number of an RFID transponder 18 to a particular component 12, to other portions of the component 12, to past and/or current mating components 12, and to any other parameter, connection, association, or other information that a technician may want to know or record when working with and/or monitoring the one or more components 12.

In this embodiment, the component 12(1) can also exchange and/or communicate the sensor data from the sensor 28 to the mating component 12(2) and/or the RFID reader 20. The component 12(1) can communicate the sensor data to the RFID reader 20 in response to a poll via the interrogation signal 24 generated and received by the antennas 34(1), 34(2). If the sensor data is communicated to the mating component 12(2), the mating component 12(2) could also communicate the sensor data to the RFID reader 20. In either case, the sensor data can be associated with the identity information of the component 12(1) and the mating component 12(2) when connected. If the location of the mating component 12(2) is known, the location of the sensor 28 is known and thus the location relevant to the sensor data. In this manner, the sensor data will be location-specific sensor data. Thus, the location can be more specific to a narrower area range than the read range of the RFID reader 20, for example down to centimeter (cm) scale resolution. In this manner, the sensor data can be associated precisely to a particular component 12 rather than a general area, which may have a number of components 12, and in some cases a high density of components 12. This identity information-to-location association may be performed within the mating component 12(2) itself if aware of its location, the RFID reader 20, the RFID reader system 22, and/or the component management system 26. Further, the components 12, the RFID reader 20, and/or the component management system 26 may determine if the sensor data exceeds programmed threshold level, and if so, generate an alarm or report. The alarm or report can include display information on displays associated with the components 12, as will be discussed in more detail below.

Even if the fixed location of the mating component 12(2) is not known, the relative location of the component 12(1) and mating component 12(2) will be known as being located together due to their mating. Thus, the embodiments disclosed herein allow for both fixed and relative location association with sensor data. Further, the embodiments disclosed herein allow for the location of the sensor data to be dynamically updated by detecting the mating of both removable and fixed components 12. Even if the component 12(1) is not connected with mating component 12(2), the component 12(1) can still communicate its identity information and the sensor data to the RFID reader 20. Also, the mating component 12(2), by only communicating its own identity information to the RFID reader 20, can provide an indication that a component 12(1) is not connected to the mating component 12(2), or that a component 12(1) connected to the mating component 12(2) is not capable of exchanging identity information.

As examples, the ability to associate a specific location to sensor data relating to a component 12 may be useful for a number of reasons and applications. For example, if the sensor data includes air flow and/or air temperature data, the sensor data can be used to determine if the air flow or temperature level surrounding a given component is sufficient to achieve desired performance and/or to prevent potential failures of components due to lack of air flow and overheating. As another example, the sensor data may include humidity level data indicative of whether the moisture level is too high for components 12 or articles of manufacture 14, which risks failures. If the sensor data includes movement data, human contact with components 12 can be detected when human contact may be forbidden. For example, the components 12 may connect links carrying highly sensitive data or information. If the sensor data includes impact data, damage or potential damage to fragile components 12 and articles of manufacture 14 may be detected so that testing and replacement of components 12 can be performed to avoid potential failures and/or reduce downtime attributed to failed components 12.

It may also be important to confirm that a component 12 is out-of-service before its removal by service personnel. The sensor data may also allow recording of timing associated with sensor data to show where certain environmental and/or physical data occurred for investigation reasons. Further, by tracking changes in location in regard to components 12, inventory of the components 12 can be tracked and maintained. Open slots within the articles of manufacture 14 can also be tracked by lack of identity information exchange with a mating component 12(2). As another example, the sensor 28 could detect velocity or acceleration to track the velocity or acceleration of moving components, such as disk drive components as an example, wherein the sensor data is associated with a specific location of a component 12. Other examples of sensors 28 that produce sensor data of interest and may be included in a component 12(1) or mating component 12(2) include, but are not limited to, voltage level sensors, current level sensors, pressure sensors, audible sensors, stress sensors, wavelength sensors, signal strength sensors, phase shift sensors, impedance sensors, shock sensors, input voltage standing wave ratio (VSWR) sensors, signal quality sensors, orientation sensors, light level (both ambient and optical fiber light levels) sensors, and contact sensors, including switches, and flow sensors for air or liquid flow, or both, etc. Sensors 28 may detect sensor data on installation, removal, re-installation, and/or operation of components 12. Any type of sensor 28 that can be integrated or coupled to a component 12 and provide sensor data can be employed.

Figure 2:
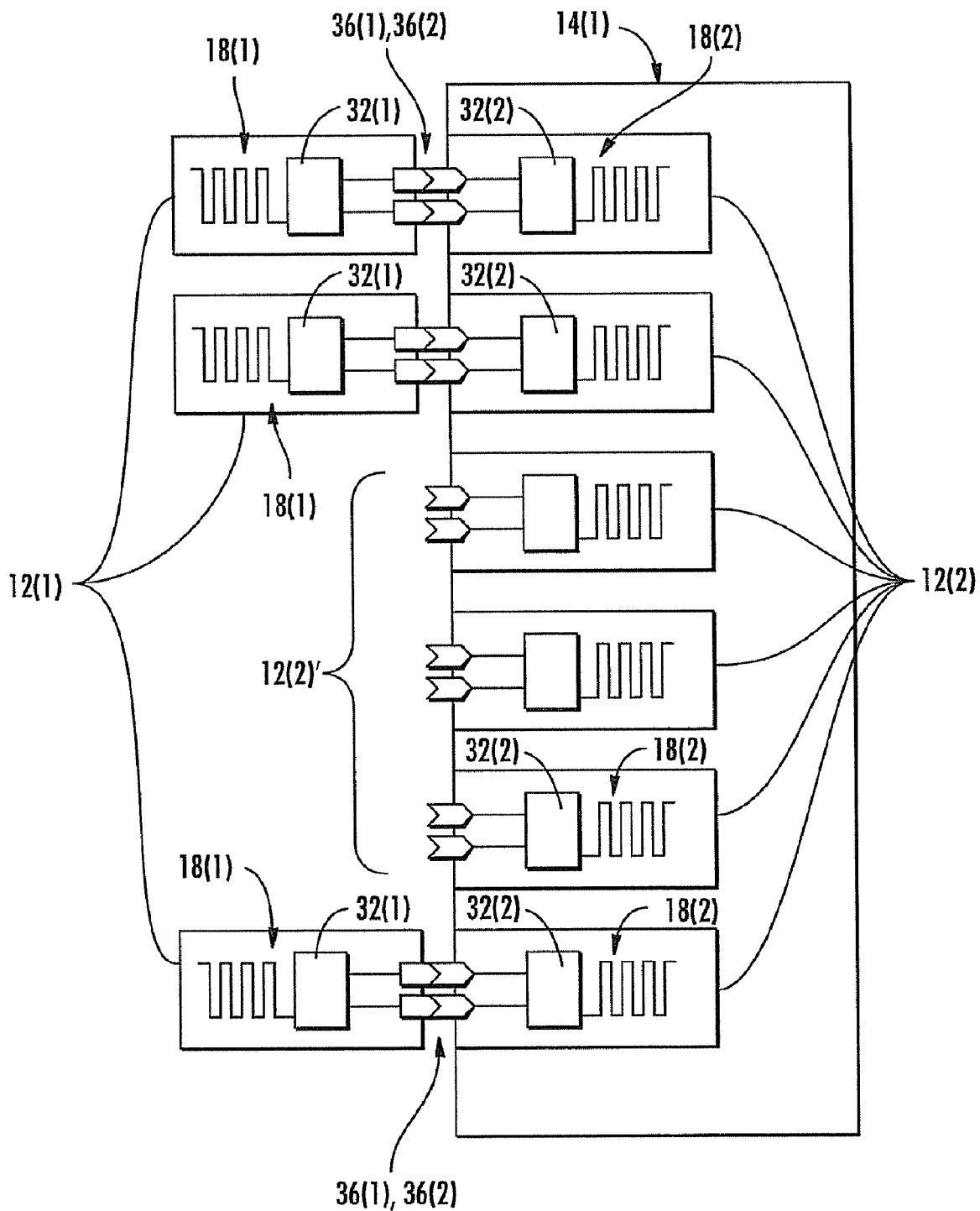
FIG. 2 is a schematic diagram of exemplary equipment having a plurality of fixed, mating components with one or more removable components connected to the mating components.

FIG. 2 illustrates a specific application example of an article of manufacture 14 containing a plurality of fixed mating components 12(2) to further illustrate possibilities. In this embodiment, the article of manufacture 14 is a patch panel 14(1) configured to accept more than one connection with a component 12(1). For example, the patch panel 14(1) may be provided in a fiber optic module, wherein each of the fixed mating components 12(2) are fiber optic adapters configured to receive components 12(1) in the form of fiber optic connectors to establish optical connections. Alternatively, the patch panel 14(1) may be electrical equipment wherein each of the fixed mating components 12(2) are electrical sockets configured to receive components 12(1) in the form of electrical plugs to establish electrical connections. Removable components 12(1) can be plugged in or connected to any of the mating components 12(2) to establish a connection and to establish communication between their respective RFID transponders 18(1), 18(2). Even if particular mating components 12(2)' are not receiving a component 12(1), and are thus empty as illustrated in FIG. 2, the IC chips 32(2) can still communicate via their RFID transponders 18(2) to the RFID reader 20 to provide identity information and lack of component 12(1) identity information to signify non-connection. This may be particularly useful in allowing the component management system 26 to identify empty slots in the patch panel 14(1) and to allow a technician quickly and easily to determine expansion plans, such as whether additional equipment should be ordered to accommodate additional components 12.

Figure 3:
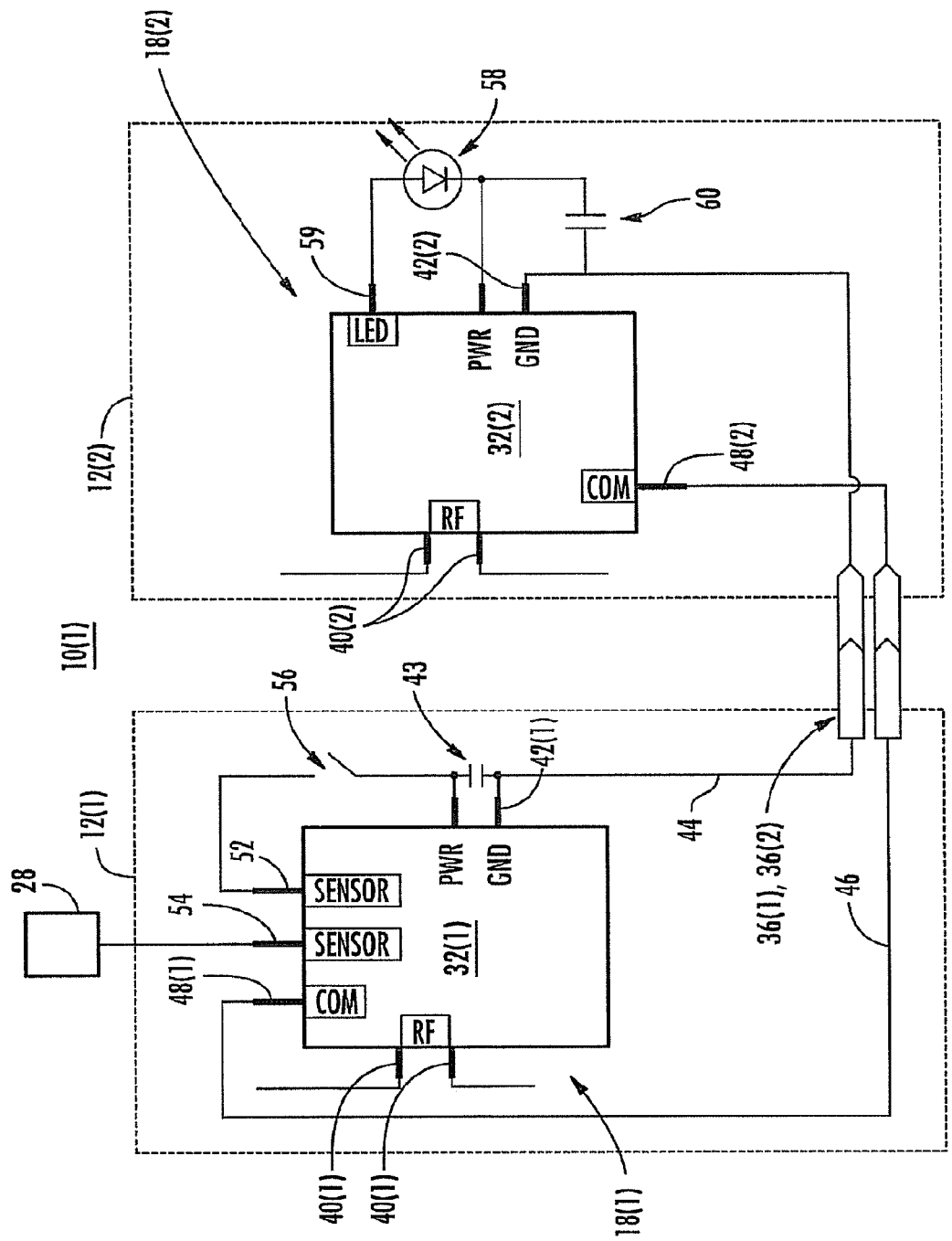
FIG. 3 is a schematic diagram of an exemplary circuit for coupling RFID-enabled integrated circuit (IC) chips in connected RFID-equipped components.

To provide further detail regarding how RFID transponders 18(1), 18(2) may be communicatively coupled together by example, FIG. 3 is provided. FIG. 3 illustrates more detail on an exemplary chip and pin layout of exemplary IC chips 32(1), 32(2) of the RFID transponders 18(1), 18(2) of the component mating system 10(1) in FIG. 1. The IC chips 32(1), 32(2) are electrically and communicatively coupled to each other when their respective component 12(1) and mating component 12(2) are connected. In this regard, the component mating system 10(1) includes two RFID transponders 18(1), 18(2), one for each component 12(1), 12(2). The IC chips 32(1), 32(2) of the RFID transponders 18(1), 18(2) are coupled together when connections are made between the components 12(1), 12(2). In this embodiment, and as previously discussed with regard to FIG. 1, the IC chips 32(1), 32(2) are RFID-enabled, meaning they contain a transponder or other communication device and an antenna interface adapted to be coupled to antennas to communicate wirelessly using RF communications.

Each IC chip 32(1), 32(2) contains RF inputs in the form of RF input pins 40(1), 40(2) configured to couple to an antenna 34(1), 34(2) (see FIG. 1). The antennas 34(1), 34(2) coupled to the IC chips 32(1), 32(2) are configured to receive RF communication signals from the RFID reader 20 via the RF input pins 40(1), 40(2). Note that the RF input pins 40(1), 40(2) can also support any type of antenna, including dipole antenna, monopole antenna, or any other type of antenna. An antenna coupled to the RF input pins 40(1), 40(2) may be configured to operate at any frequency desired, including 2.4 GHz and 900 MHz, as examples.

As further illustrated in FIG. 3, the RFID-enabled IC chips 32(1), 32(2) can be designed to be coupled in a daisy-chain fashion. Ground is coupled together for each IC chip 32(1), 32(2) when a connection is established by coupling ground pins 42(1), 42(2) of the IC chips 32(1), 32(2) together via ground line 44. One or more capacitors 43 may be coupled between PWR and GND for filtering as is well known. Also as illustrated in FIG. 3, the IC chips 32(1), 32(2) are configured to communicate with each other over serial bus communication line 46. Each IC chip 32(1), 32(2) contains at least one communication pin 48(1), 48(2). Each communication pin 48(1), 48(2) allows serial communications to and from the IC chips 32(1), 32(2). Additional IC chips 32, RFID-enabled or not, can be connected together in a daisy-chain fashion and communicatively coupled to each other if a second communication pin 48 is provided in the IC chip 32.

In this embodiment, the RFID-enabled IC chip 32(1) also contains a sense function that activates the IC chip 32(1) in response to an activation of sense pins 52, 54. Although not illustrated in FIG. 3, the sense pins 52, 54 may also be provided on IC chip 32(2). The sense pins 52, 54 may be activated in response to detecting at least one condition. In this embodiment, this includes activation of a switch 56 that may be provided as part of the component 12(1). When the switch 56 is activated, a circuit is completed to the sense pin 52, which in turn causes the IC chip 32(1) to communicate with the IC chip 32(2). The activation of the switch 56 can be actuated by a hand-operated activation button, which may be spring loaded, but other activation structures such as slides, contact sensors, and the like are also provided in further embodiments. In alternative embodiments, the switch 56 can be activated when the component 12(1) is connected with the mating component 12(2). Thus, when activated, the IC chip 32(1) can provide information regarding the condition detected and may also provide other information, such as identification information. A technician could identify a given component by having the RFID reader 20 interrogate a panel full of RFID-enabled components 12, then pressing the button for the switch 56 on the given component 12, and monitoring the output from the RFID reader 20 to look for which component indicates a certain condition and/or change in condition. This could be accomplished, if desired, without otherwise manipulating, plugging, or unplugging the component 12, thus preventing undesirable disconnection of services (albeit temporary) to one or more customers.

Also in this embodiment, the sensor 28 is coupled to the other sense pin 54 as part of the component 12(1). The sensor 28 is configured to provide sensor data to the IC chip 32(1) via the sense pin 54, which in turn causes the IC chip 32(1) to communicate with the IC chip 32(2). Activating the RFID-enabled IC chips 32(1), 32(2) also allows information to be provided to the RFID reader 20 in response to the interrogation signal 24. However, note that if the IC chips 32(1), 32(2) are connected together, an electrical connection between the IC chips 32(1), 32(2) is still made and information between the IC chips 32(1), 32(2) can be exchanged. In response to a condition change or activation, the RFID reader 20 may also communicate to the RFID transponder 18(2) to cause a light source 58, such as a light emitting diode (LED) or other light source coupled to an LED pin 59, to light up to indicate to the technician which mating component 12(2) to connect to the component 12(1). Other examples of light sources that may comprise the light source 58 include a liquid crystal display (LCD), and an electroluminescent display. The light source 58 may be powered by energy from the interrogation signal 24 transmitted by the RFID reader 20. A capacitor bank 60 may also be provided in the RFID transponder 18(2) to be charged during interrogation by the RFID reader 20 and to provide reserve power to the light source 58 when not being interrogated by the RFID reader 20 or when energy from the RFID reader 20 is sporadic or otherwise not strong enough to power the RFID transponder 18(2).

The remainder of this description and FIGS. 4-18 discuss additional exemplary embodiments of component mating systems 10 that may be employed to provide location-specific sensor data. In these embodiments, one or more sensors 28 provide sensor data that is associated with the identity of a component 12. In this manner, the location of the sensor data can be determined as opposed to a general, non-specific area.

Figure 4:
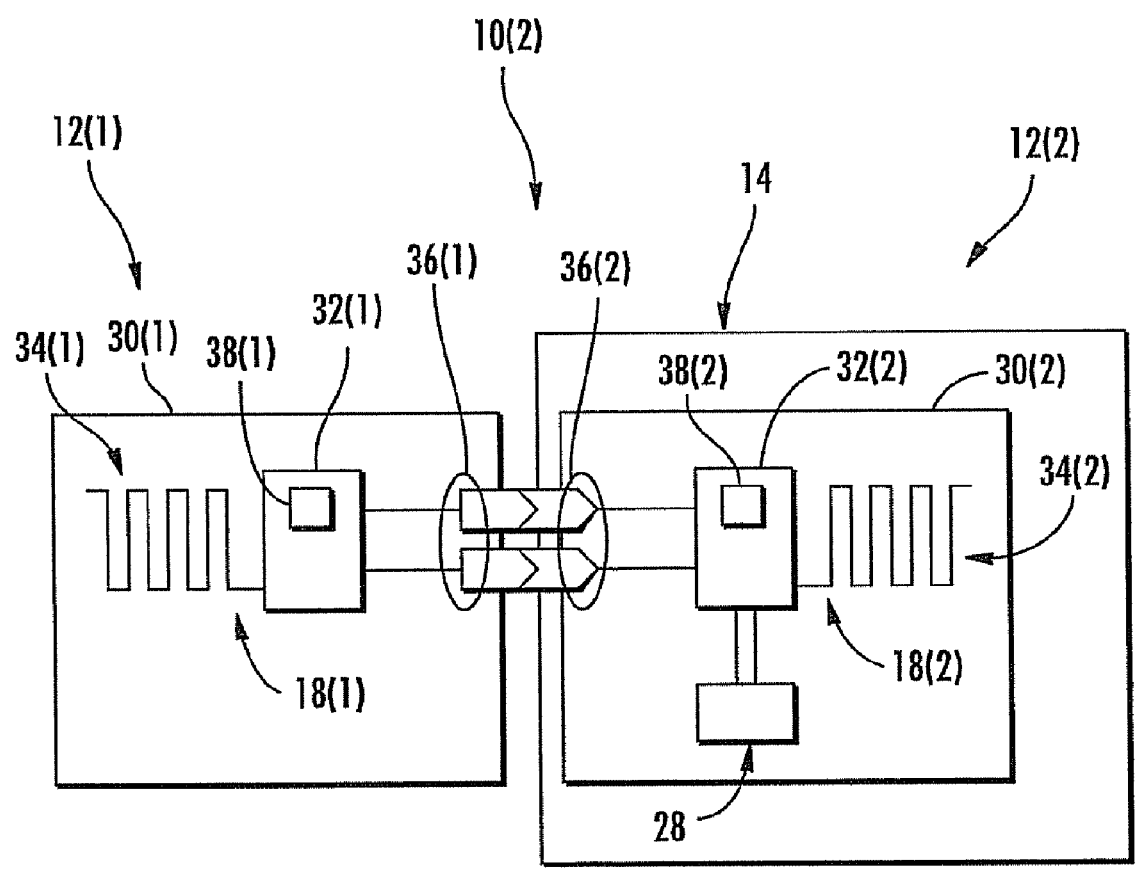
FIG. 4 is a schematic diagram of another exemplary component mating system, wherein the sensor is provided as part of the mating component.

In this regard, FIG. 4 illustrates another exemplary embodiment of a component mating system 10(2) wherein two components 12(1), 12(2) are again mated to each other. The component mating system 10(2) is essentially the same configuration and arrangement as the component mating system 10(1) of FIG. 1, except that the sensor 28 is provided in the mating component 12(2) and coupled to the RFID transponder 18(2) instead of the component 12(1) and RFID transponder 18(1). In this regard, sensor data comprising environmental and/or physical information sensed by sensor 28 relating to the mating component 12(2) or its surroundings is communicated to the RFID transponder 18(2). Because the sensor 28 is located in close proximity to the component 12(1) when connected to the mating component 12(2), the sensor data is also related to the component 12(1). Identity information regarding the component 12(1) and mating component 12(2) stored in the respective memory 38(1), 38(2) of their RFID transponders 18(1), 18(2) can be exchanged over electrical leads 36(1), 36(2) when coupled to each other. Both the component 12(1) and the mating component 12(2) can include leads 36(1), 36(2) that can be connected to each other as illustrated, or electrical leads 36 may only be included on either the component 12(1) or the mating component 12(2). In either scenario, when the IC chips 32(1), 32(2) are coupled to each other, the sensor data along with the identity of the mating component 12(2) and component 12(1) can be interrogated by the RFID reader 20 (see FIG. 1) such that the sensor data is associated with the component 12(1) and mating component 12(2). If the location of the mating component 12(2) is known, the location of the mating component 12(2) can be associated with the sensor data such that the sensor data becomes location-specific for the mating component 12(2) and/or component 12(1). If the component 12(1) is not connected to the mating component 12(2), the sensor data can still be associated with the identity information of the mating component 12(2) and communicated to the RFID reader 20. If the identity information of the component 12(1) is not communicated by the mating component 12(2) to the RFID reader 20, this is an indication that a component is not connected to the mating component 12(2) at that time. As soon as the component 12(1) is connected to the mating component 12(2), the RFID transponders 18(1), 18(2) will establish communication with each other to exchange identity information, in which case the sensor data can then be associated with both the component 12(1) and the mating component 12(2).

Alternatively or in addition, the sensor data from the sensor 28 could be communicated over the electrical leads 36(1), 36(2) to the RFID transponder 18(1) in the component 12(1). The component 12(1) could then associate the received identity information of the mating component 12(2) with the received sensor data and communicates such to the RFID reader 20. This is because the RFID transponder 18(1) in the component 12(1) can communicate the sensor data via RF communications, as previously discussed. The sensor data can be associated with the component 12(1) and/or mating component 12(2) just as if the mating component 12(2) communicated the sensor data to the RFID reader 20. If the location of the mating component 12(2) is known, that location can be associated with the sensor data such that it becomes location-specific sensor data. Also, both the component 12(1) and mating component 12(2) could communicate their identity information along with exchanged identity information of the other and the sensor data to the RFID reader 20. In this manner, the RFID reader system 22 could determine if both the component 12(1) and mating component 12(2) communicated the same identity connectivity and sensor data as a redundancy check. If not the same, this may be an indication of a failure of the component 12(1), mating component 12(2), or both.

Figure 5:
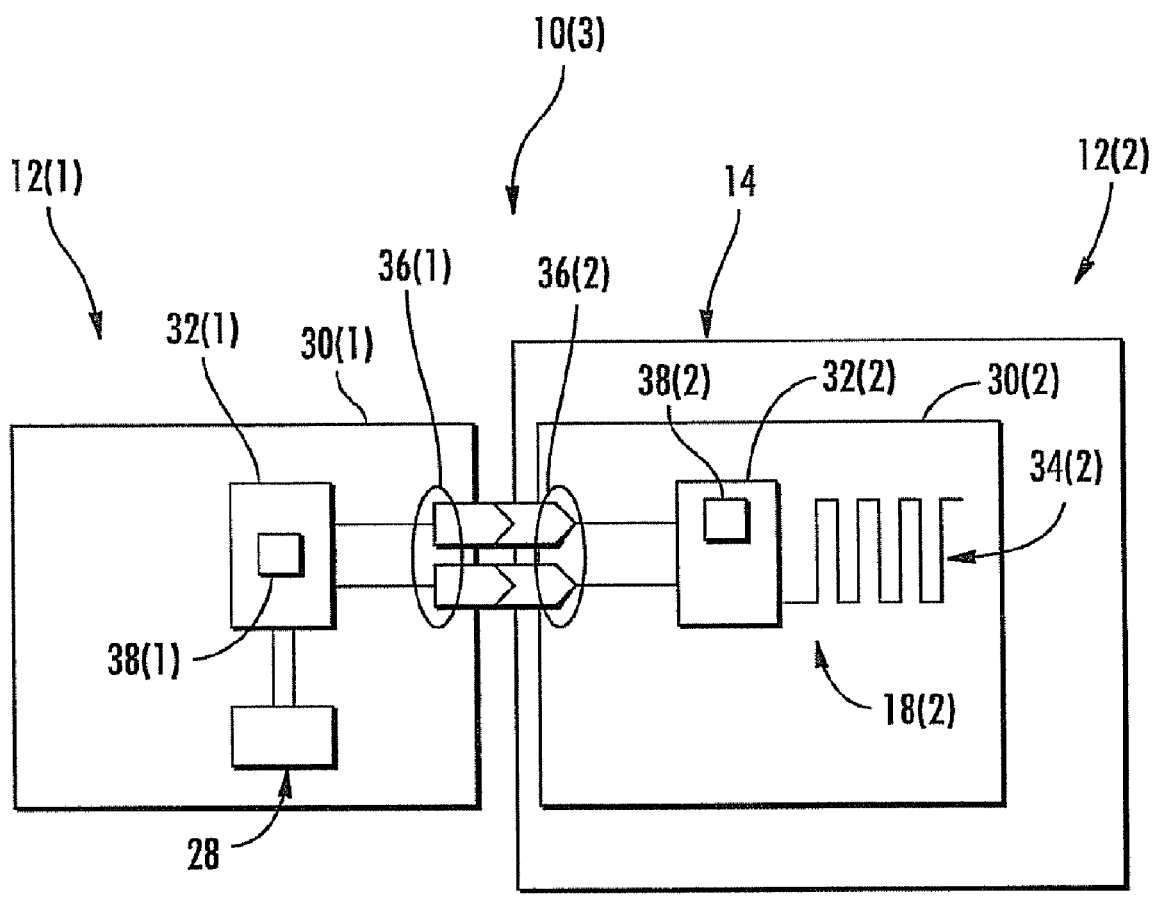
FIG. 5 is a schematic diagram of another exemplary component mating system, wherein the component is not RFID-enabled.

FIG. 5 illustrates another exemplary embodiment of a component mating system 10(3) wherein two components 12(1), 12(2) are again mated to each other. The component mating system 10(3) is essentially the same configuration and arrangement as the component mating system 10(1) of FIG. 1, except that the IC chip 32(1) is not RFID-enabled, or an antenna for a provided RFID transponder is disconnected or obscured such that the RFID transponder is not operational and thus is not RFID-enabled (referred to as "not RFID-enabled"). Thus, any wireless communications between the component mating system 10(3) and the RFID reader 20 is through the RFID transponder 18(2) and antenna 34(2) provided in the mating component 12(2). All other functionalities and possibilities that exist for the component mating system 10(1) of FIG. 1 are possible for the component mating system 10(3) of FIG. 5, with the exception of the ability of the component 12(1) to wirelessly communicate information to the RFID reader 20, and thus will not be repeated here.

Figure 6:
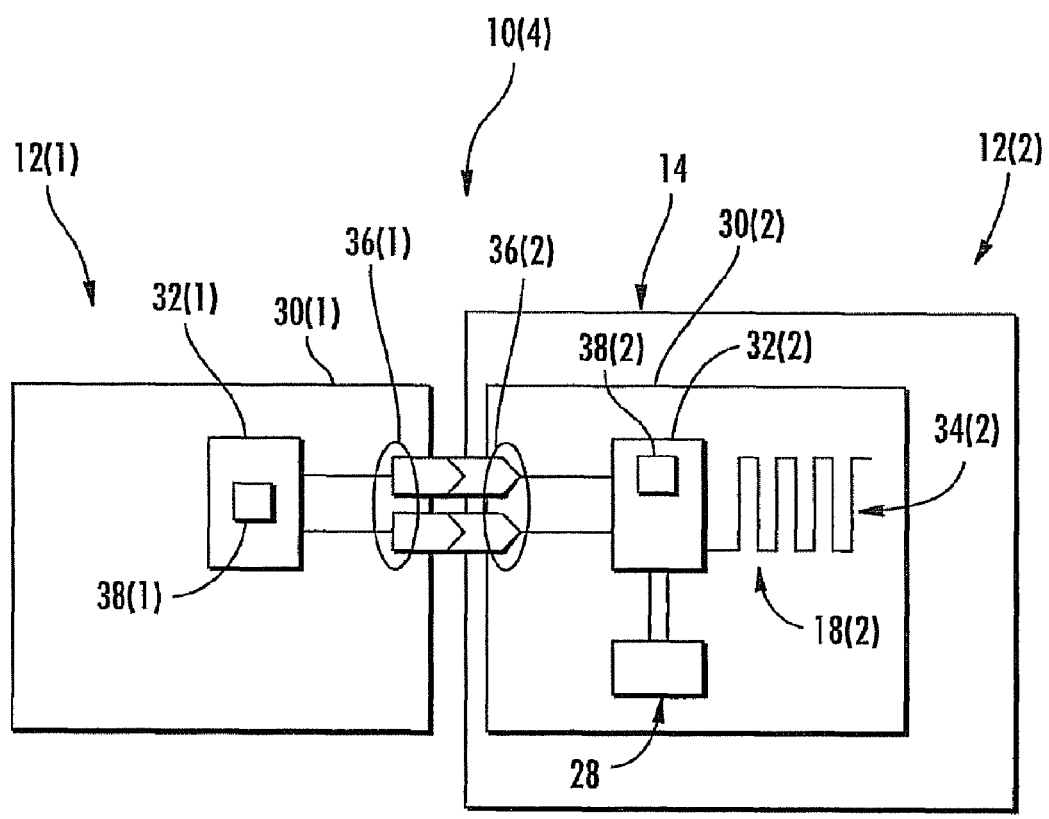
FIG. 6 is a schematic diagram of another exemplary component mating system, wherein the component is not RFID-enabled and a sensor is provided as part of the mating component.

FIG. 6 illustrates another exemplary embodiment of a component mating system 10(4) wherein two components 12(1), 12(2) are again mated to each other. The component mating system 10(4) is essentially the same configuration and arrangement as the component mating system 10(3) of FIG. 5 discussed previously, except that the sensor 28 is provided in the mating component 12(2) instead of the component 12(1). The IC chip 32(1) in the component 12(1) is not RFID-enabled. Thus, any wireless communications between the component mating system 10(4) and the RFID reader 20 is through the RFID transponder 18(2) and antenna 34(2) provided in the mating component 12(2). When the component 12(1) is connected with the mating component 12(2), the identity information of the component 12(1) is communicated to the RFID transponder 18(2). The mating component 12(2) can communicate the identity information of itself as well as the component 12(1) along with the sensor data to the RFID reader 20.

The sensor data can be associated with the component 12(1) and the mating component 12(2). If the location of the component 12(1) or mating component 12(2) is known, that location can be associated with the sensor data such that it becomes location-specific sensor data. Even if a component 12(1) is not connected to the mating component 12(2), the mating component 12(2) can still communicate its identity information and the sensor data to the RFID reader 20, in which case the sensor data can still be associated with the mating component 12(2). If the location of the mating component 12(2) is known, that location can be associated with the sensor data such that it becomes location-specific sensor data. All other functionalities and possibilities that exist for the component mating system 10(3) of FIG. 5 exist for the component mating system 10(4) of FIG. 6, with the exception of the ability of the component 12(1) to wirelessly communicate information to the RFID reader 20, and thus will not be repeated here.

Figure 7:
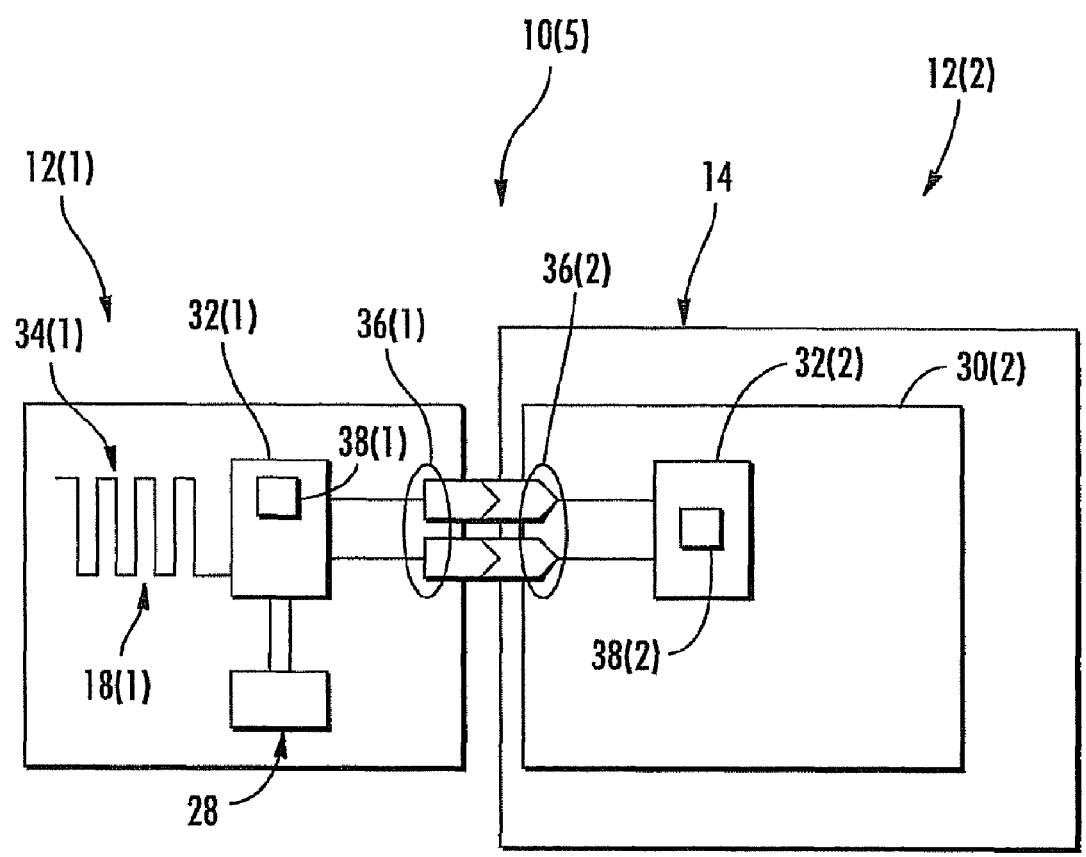
FIG. 7 is a schematic diagram of another exemplary component mating system, wherein the mating component is not RFID-enabled and the sensor is provided as part of the component.

FIG. 7 illustrates another exemplary embodiment of a component mating system 10(5) wherein two components 12(1), 12(2) are again mated to each other. The component mating system 10(5) contains essentially the opposite configuration and arrangement as the component mating system 10(4) of FIG. 6 discussed previously. In this regard, the component 12(1) includes RFID transponder 18(1), whereas the IC chip 32(2) in the mating component 12(2) is not RFID-enabled. Thus, any wireless communications between the component mating system 10(5) and the RFID reader 20 is through the RFID transponder 18(1) and antenna 34(1) provided in the component 12(1). The sensor 28 is provided as part of the component 12(1) and coupled to the RFID transponder 18(1), whereas the mating component 12(2) does not contain a sensor. The IC chip 32(2) of the mating component 12(2) contains memory 38(2) to store its identity information although the IC chip 32(2) is not RFID-enabled. The identity information of the mating component 12(2) can be communicated to the RFID transponder 18(1) when the connection between the component 12(1) and the mating component 12(2) is established. The component 12(1) can communicate the identity information of itself as well as the mating component 12(2) along with the sensor data to the RFID reader 20.

The sensor data can be associated with the component 12(1) and the mating component 12(2). If the location of the component 12(1) or mating component 12(2) is known, that location can be associated with the sensor data such that it becomes location-specific sensor data. Even if a mating component is not connected to component 12(1), the component 12(1) can still communicate its identity information and the sensor data to the RFID reader 20, in which case the sensor data can still be associated with the component 12(1). If the location of the component 12(1) is known, that location can be associated with the sensor data such that it becomes location-specific sensor data. All other functionalities and possibilities that exist for the component mating system 10(4) of FIG. 6 exist for the component mating system 10(5) of FIG. 7, with the exception of the ability of the mating component 12(2) to wirelessly communicate information to the RFID reader 20, and thus will not be repeated here.

Figure 8:
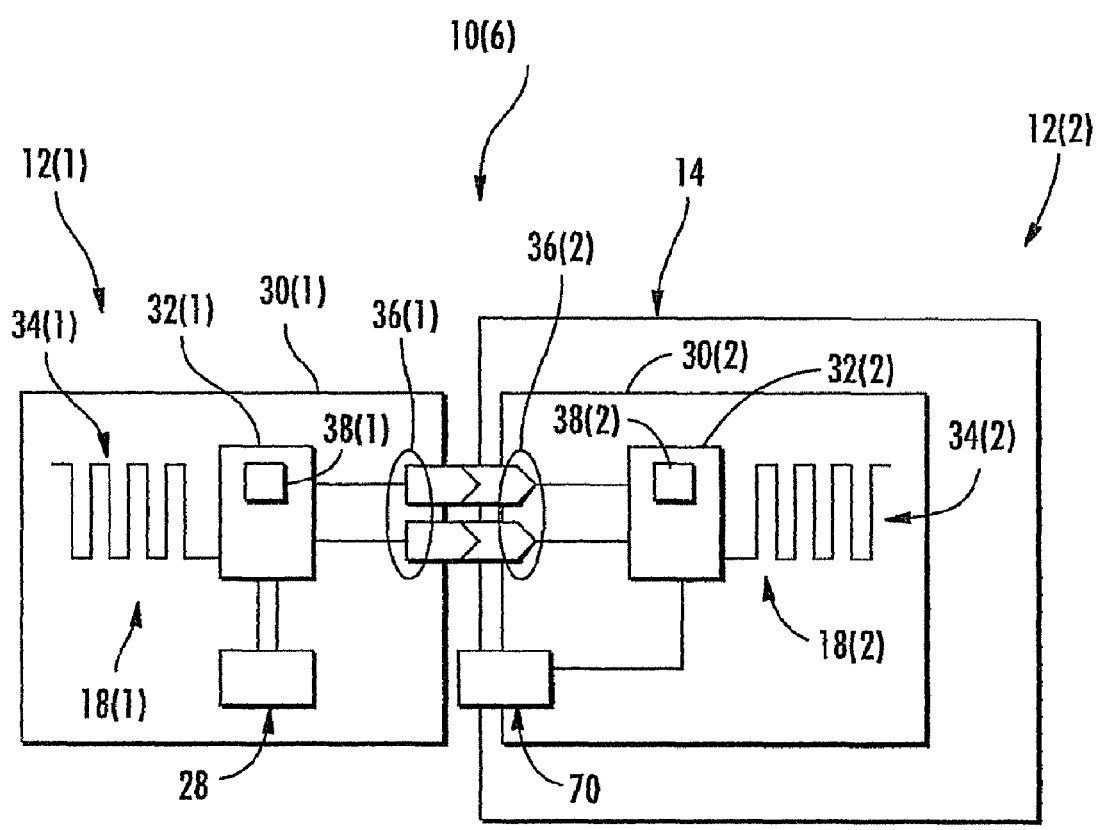
FIG. 8 is a schematic diagram of another exemplary component mating system, and further comprising a display provided in the mating component.

FIG. 8 illustrates another exemplary embodiment of a component mating system 10(6) wherein two components 12(1), 12(2) are again mated to each other. The component mating system 10(6) is essentially the same configuration and arrangement as the component mating system 10(1) of FIG. 1, except that a display 70 is provided as part of the mating component 12(2). The display 70 is electrically coupled to the IC chip 32(2) of the RFID transponder 18(2) in this embodiment. The display 70 can display an identity of a mating component 12(2) to a technician in which to connect another component, such as the component 12(1). Examples of displays 70 include, but are not limited to, a light emitting diode (LED), an alpha display, a numeric display, an alphanumeric display, a liquid crystal display (LCD), and an electroluminescent display. The display 70 may also provide other data, including the value of sensor data, or alarms indicative of whether sensor data has exceeded a predefined threshold value. The RFID transponder 18(1) may make this determination, or it may be made by the RFID reader 20 and/or component management system 26, which can then communicate the alarm condition to the RFID transponder 18(1) to be displayed on the display 70. The display 70 may be the light source 58 illustrated in FIG. 2 and discussed previously. As discussed therein, in response to a condition change or activation, the RFID reader 20 may also communicate to the RFID transponder 18(2) to cause the IC chip 32(2) to activate the display 70 to light up to indicate to the technician the mating component 12(2) to which the component 12(1) should be connected. All other functionalities and possibilities that exist for the component mating system 10(1) of FIG. 1 exist for the component mating system 10(6) of FIG. 8 and thus will not be repeated here.

Figure 9:
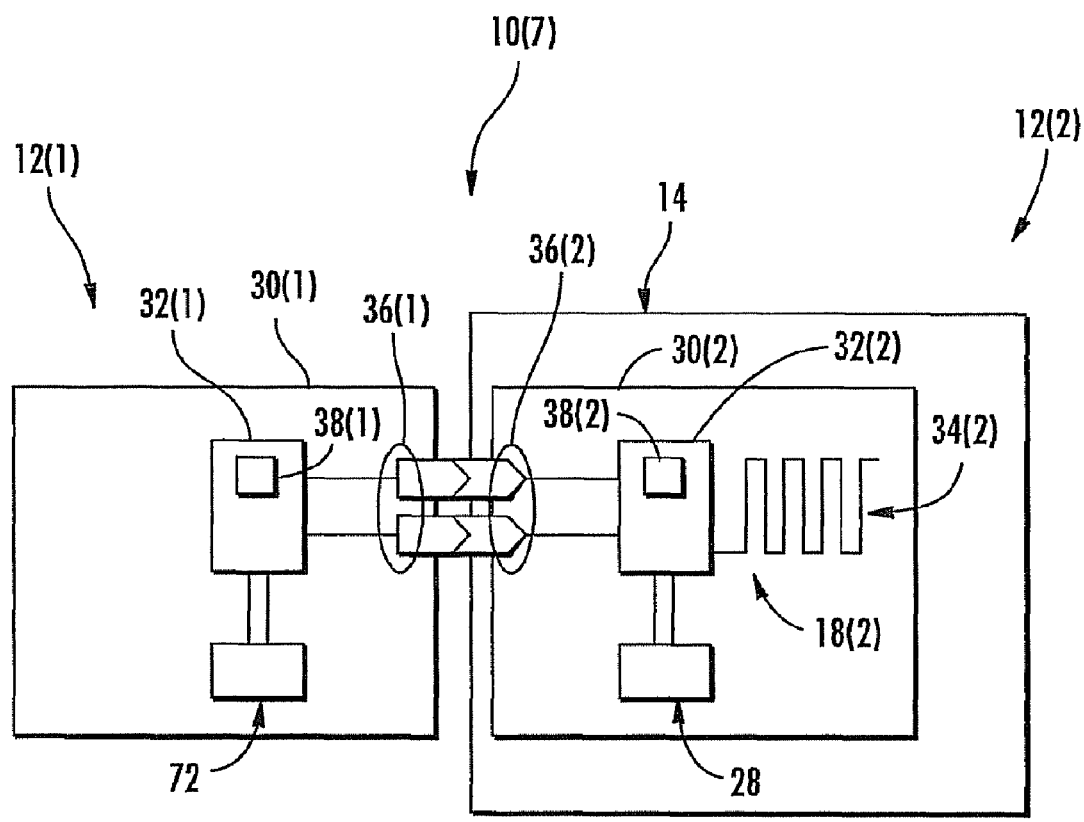
FIG. 9 is a schematic diagram of another exemplary component mating system, and further comprising a display provided in the component.

FIG. 9 illustrates another exemplary embodiment of a component mating system 10(7) wherein the two components 12(1), 12(2) are again mated to each other. The component mating system 10(7) is essentially the same configuration and arrangement as the component mating system 10(6) of FIG. 8, except that a display 72 is provided as part of the component 12(1) and the sensor 28 is provided as part of the component 12(1) instead of the component 12(2). The display 72 is electrically coupled to the IC chip 32(1) in this embodiment which is not RFID-enabled. The display 72 can be a light source, or a numeric, alpha, or alphanumeric display, as examples. The display 72 can be used to provide a technician information regarding the component 12(1), including but not limited to specific instructions during maintenance operations. The display 72 may also be used to provide a status of the link, so that a live connection is not interrupted by removal of a component 12, or indicate information regarding sensor data, including but not limited to whether sensor data has exceeded a given programmed or designed threshold level. The display 72 may display identity information of the component 12(1), which may be useful in identifying a particular component in the field. Further, the display 72 can display the identity information of a mating component 12(2) connected to the component 12(1) as a result of identity information exchange between the IC chips 32(1), 32(2).

The display 72 may be activated manually such as in response to a switch coupled to the IC chip 32(1). An example is the switch 56 illustrated in FIG. 3, discussed previously. The display 72 may be activated in response to a condition change or activation, such that the RFID reader 20 communicates information or a condition to the IC chip 32(1) to be displayed to light up to indicate to the technician which mating component 12(2) to connect to the component 12(1).

Figure 10:
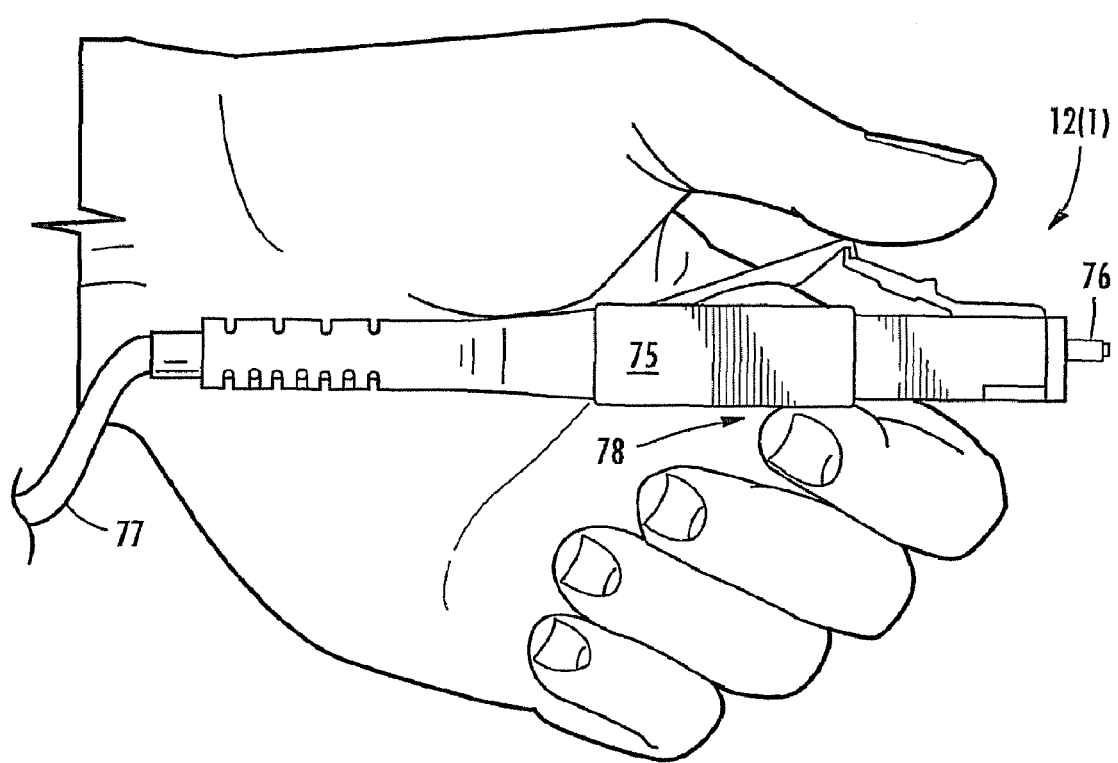
FIG. 10 illustrates an RFID-equipped duplex LC fiber optic connector component that may be employed as the component in the component mating system of FIG. 9 gripped by a technician.

To further illustrate the ability of the component 12(1) to be activated by a switch, such as the switch 56 in FIG. 3, FIG. 10 illustrates one type of exemplary component 12(1). In this example, the component 12(1) is a duplex LC fiber optic connector 75 that provides one or more optical ferrules 76 carrying one or more optical fibers from a fiber optic cable 77. The connector 75 is activated by a technician pressing an activation button 78 (not shown as being located underneath the fiber optic connector 75). Pressing the activation button 78 activates the IC chip 32(1), which may include causing the display 72 to display information, such as a light or textual information to the technician, as well as initiate RF communications to and from an RFID reader 20. In this manner, the RFID reader 20 may communicate with a mating component 12(2) to cause its display 70 to provide information to the technician, as provided in FIG. 8, to indicate to which mating component 12(2) the component 12(1) should be connected. All other functionalities and possibilities that exist for the component mating system 10(6) of FIG. 8 exist for the component mating system 10(7) of FIG. 9 and thus will not be repeated here.

Figure 11:
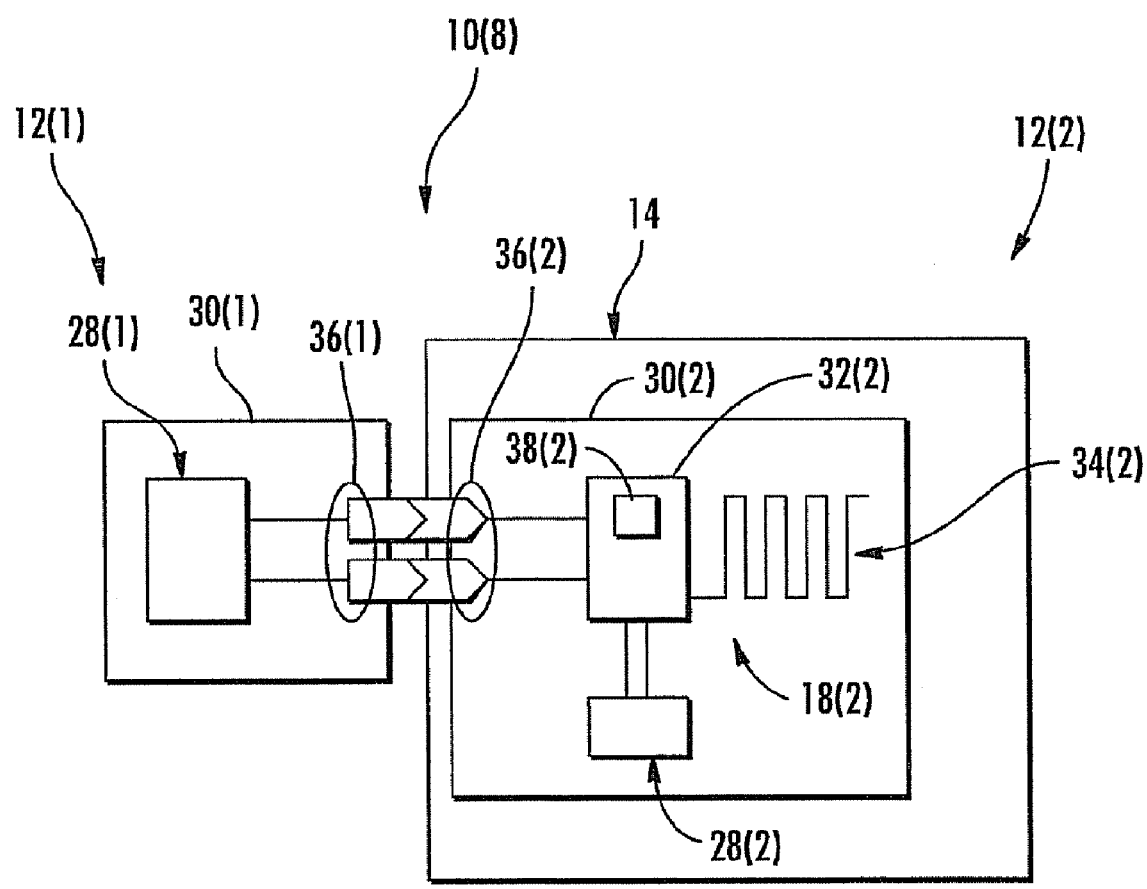
FIG. 11 is a schematic diagram of another exemplary component mating system, and further comprising sensors provided in both the component and the mating component.

FIG. 11 illustrates another exemplary embodiment of a component mating system 10(8) wherein two components 12(1), 12(2) are again mated to each other. The component mating system 10(8) is essentially the same configuration and arrangement as the component mating system 10(4) of FIG. 6, except that only a sensor 28(1) is provided in the component 12(1). An IC chip is not provided in the component 12(1). Therefore, identity information is not exchanged from the component 12(1) to the mating component 12(2). However, sensor data from the sensor 28(1) can be communicated over the electrical leads 36(1), 36(2) to the IC chip 32(2) of RFID transponder 18(2) in the mating component 12(2). In this regard, sensor data comprising environmental and/or physical information sensed by the sensor 28(1) relating to the component 12(1) or its surroundings is communicated to the IC chip 32(2) of RFID transponder 18(2) when the component 12(1) is connected to the mating component 12(2). Because the sensor 28(1) is located in close proximity to the mating component 12(2) when connected to mating component 12(2), the sensor data is also related to the mating component 12(2). The sensor data along with any sensor data from the sensor 28(2) provided in the mating component 12(2) and coupled to the IC chip 32(2) of RFID transponder 18(2) with the identity of the mating component 12(2) can be interrogated by the RFID reader 20 (see FIG. 1) such that the sensor data is associated with the mating component 12(2). Providing two sensors 28(1), 28(2) may not only serve to provide sensor data in two areas in close proximity to the component 12(1) and the mating component 12(2), but may also provide redundancy and failure detection in the event that one of the sensors 28(1), 28(2) fails.

As soon as the component 12(1) is connected to the mating component 12(2), the sensor data from the sensor 28(1) can be communicated to the IC chip 32(2) of RFID transponder 18(2), in which case the sensor data can then be associated with the mating component 12(2). If the location of the mating component 12(2) is known, the location of the mating component 12(2) can be associated with the sensor data from both sensors 28(1), 28(2) such that the sensor data becomes location-specific for the mating component 12(2). Even if a component 12(1) is not connected to the mating component 12(2), the sensor data from sensor 28(2) can still be associated with the identity information of the mating component 12(2) and communicated to the RFID reader 20. Again, if the location of the mating component 12(2) is known, the location of the mating component 12(2) can be associated with the sensor data from the sensor 28(2) such that the sensor data becomes location-specific for the mating component 12(2). All other functionalities and possibilities that exist for the component mating system 10(4) of FIG. 6 exist for the component mating system 10(8) of FIG. 11 and thus will not be repeated here.

Figure 12:
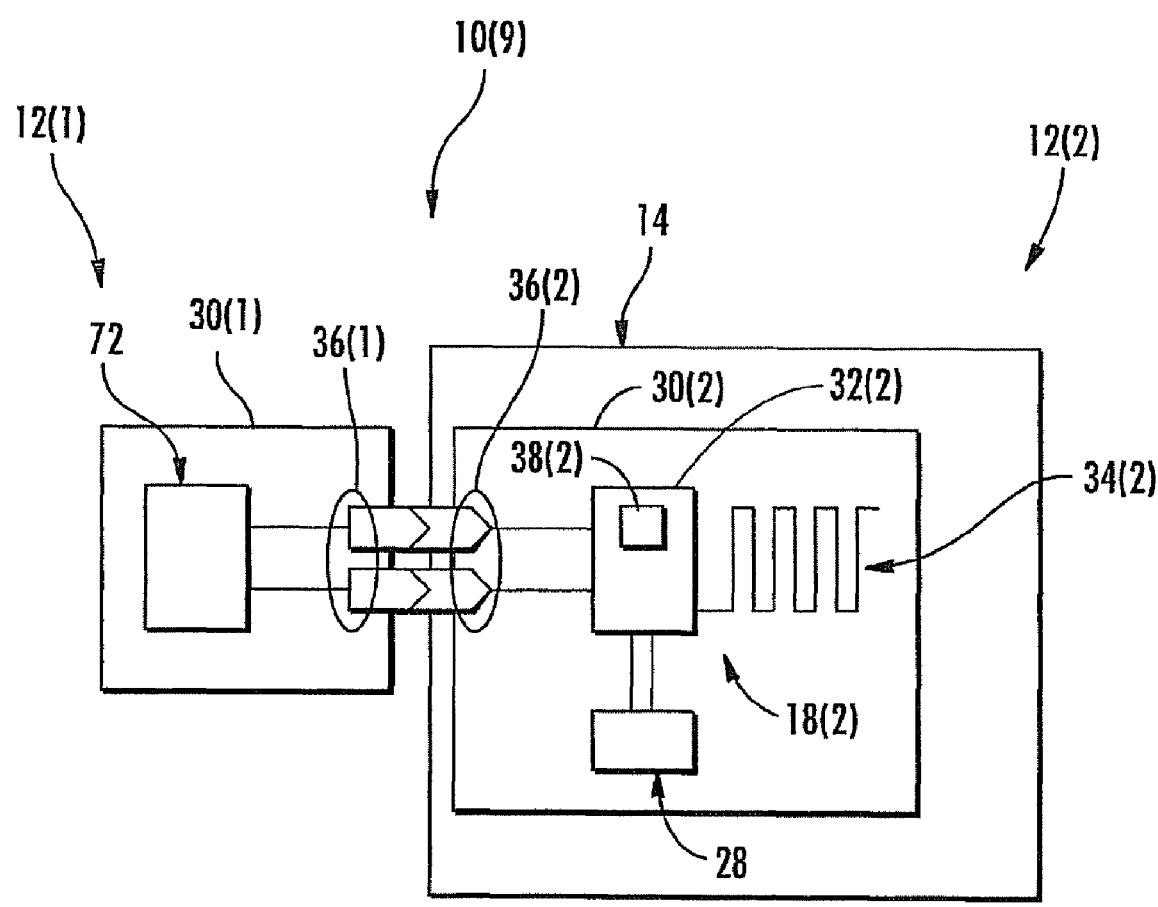
FIG. 12 is a schematic diagram of another exemplary component mating system, and further comprising a display provided in the component.

FIG. 12 illustrates another exemplary embodiment of a component mating system 10(9) wherein two components 12(1), 12(2) are again mated to each other. The component mating system 10(9) is essentially the same configuration and arrangement as the component mating system 10(7) of FIG. 9, except that only the display 72 is provided in the component 12(1). An IC chip is not provided in the component 12(1). Therefore, identity information is not exchanged from the component 12(1) to the mating component 12(2). However, data received from the IC chip 32(2) of RFID transponder 18(2) from the mating component 12(2) over the electrical leads 36(1), 36(2) when the component 12(1) is connected to the mating component 12(2) can be displayed on the display 72. This includes identity information and sensor data from the sensor 28 in the mating component 12(2). This data may be useful to a technician making component connections and for checking the status of sensor data sensed by the sensor 28 to check the environmental status of the mating component 12(2) to which the component 12(1) is connected. Because the sensor 28 is located in close proximity to the component 12(1) when connected to mating component 12(2), the sensor data can also be related to the mating component 12(2). The sensor data along with the identity of the mating component 12(2) can be interrogated by the RFID reader 20 (see FIG. 1) such that the sensor data is associated with the mating component 12(2). If the location of the mating component 12(2) is known, the location of the mating component 12(2) can be associated with the sensor data from the sensor 28 such that the sensor data becomes location-specific for the mating component 12(2).

Even if a component 12(1) is not connected to the mating component 12(2), the sensor data from the sensor 28 can still be associated with the identity information of the mating component 12(2) and communicated to the RFID reader 20. Again, if the location of the mating component 12(2) is known, the location of the mating component 12(2) can be associated with the sensor data from the sensor 28(2) such that the sensor data becomes location-specific for the mating component 12(2). All other functionalities and possibilities that exist for the component mating system 10(7) of FIG. 9 exist for the component mating system 10(9) of FIG. 12 and thus will not be repeated here.

Figure 13:
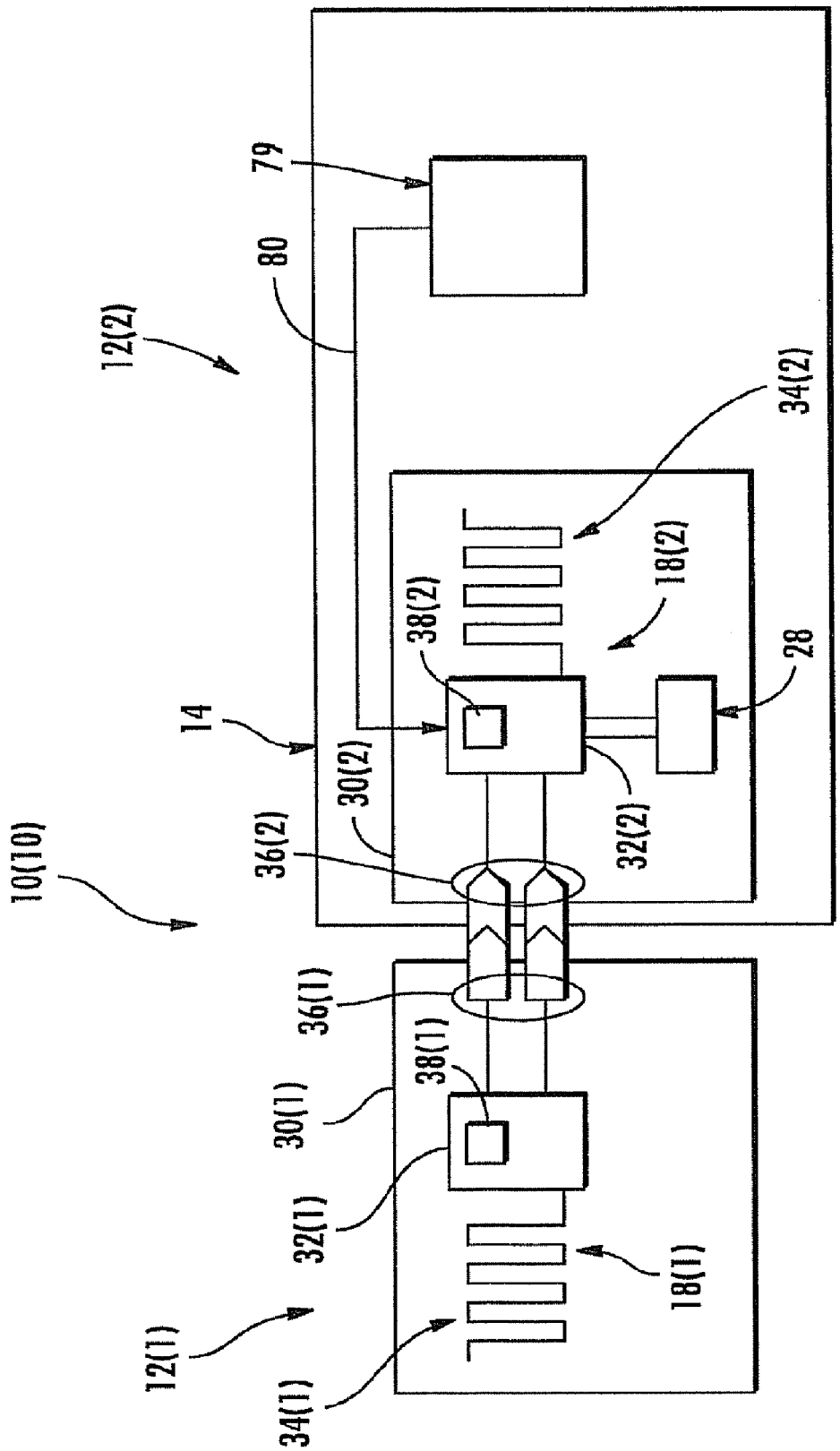
FIG. 13 is a schematic diagram of another exemplary component mating system, and further comprising an alternate power supply in the mating component.

FIG. 13 illustrates another exemplary embodiment of a component mating system 10(10) wherein two components 12(1), 12(2) are again mated to each other. The component mating system 10(10) is essentially the same configuration and arrangement as the component mating system 10(2) of FIG. 4, except that an additional power supply 79 is provided in the mating component 12(2). The additional power supply 79 may be a direct current (DC) power supply and may be used to power the IC chip 32(2) of the RFID transponder 18(2) via power line 80 in the event that the mating component 12(2) is not being powered or cannot be sufficiently powered from the interrogation signal 24 of the RFID reader 20. The IC chip 32(2) of RFID transponder 18(2) may in turn distribute the power received from the additional power supply 79 to the sensor 28 and/or the RFID transponder 18(1) in the component 12(1) over the electrical leads 36(1), 36(2), or other leads provided between the IC chips 32(1), 32(2) of RFID transponders 18(1), 18(2). The additional power supply 79 may contain a self-generating power source, such as a battery for example. Alternatively, the additional power supply 79 may contain a storage device to store excess energy from the RFID reader 20 received from the antenna 34(2) and/or the antenna 34(1). The excess energy may be communicated from the IC chip 32(1) of RFID transponder 18(1) to the IC chip 32(2) of RFID transponder 18(2) over the electrical leads 36(1), 36(2) when the component 12(1) is connected to the mating component 12(2). An example of such a storage device is illustrated in FIG. 3 as capacitor bank 60, which stores excess energy to provide power to the RFID transponder 18(2). All other functionalities and possibilities that exist for the component mating system 10(2) of FIG. 4 exist for the component mating system 10(10) of FIG. 13 and thus will not be repeated here.

Figure 14:
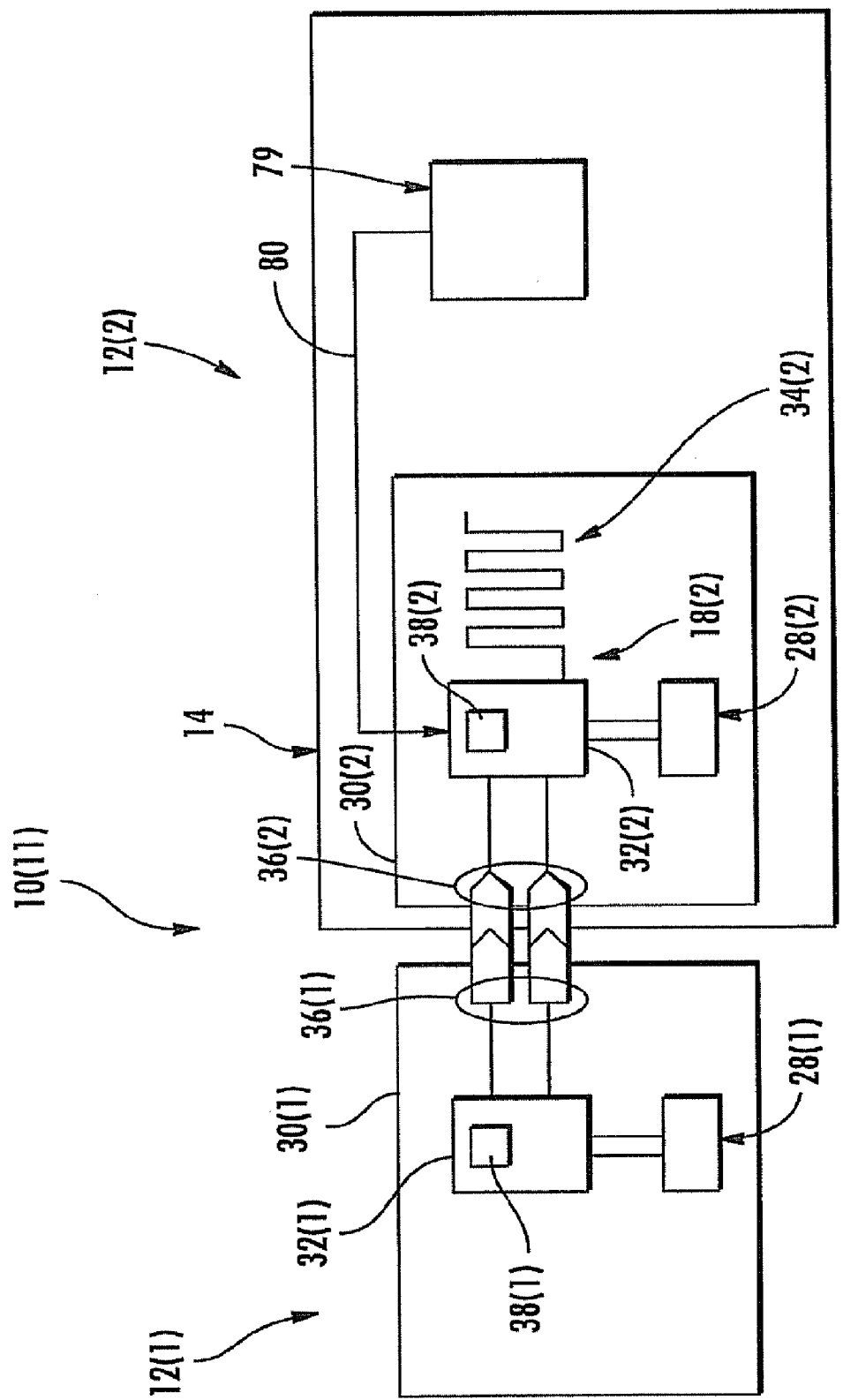
FIG. 14 is a schematic diagram of another exemplary component mating system, and further comprising an alternate power supply in the mating component.

FIG. 14 illustrates another exemplary embodiment of a component mating system 10(11) wherein two components 12(1), 12(2) are again mated to each other. The component mating system 10(11) is essentially the same configuration and arrangement as the component mating system 10(2) of FIG. 4, but with sensors 28(1), 28(2) in both the component 12(1) and the mating component 12(2) like the component mating system 10(8) of FIG. 11. Also, like the component mating system 10(10) of FIG. 13, the additional power supply 79 is provided in the mating component 12(2). The additional power supply 79 may be used to power the RFID transponder 18(2) via the power line 80 in the event that the mating component 12(2) is not being powered or cannot be sufficiently powered from the interrogation signal 24 of the RFID reader 20. All other functionalities and possibilities that exist for the component mating systems 10(2) of FIG. 4, 10(8) of FIG. 11, and 10(10) of FIG. 13 exist for the component mating system 10(11) of FIG. 14 and thus will not be repeated here.

Figure 15:
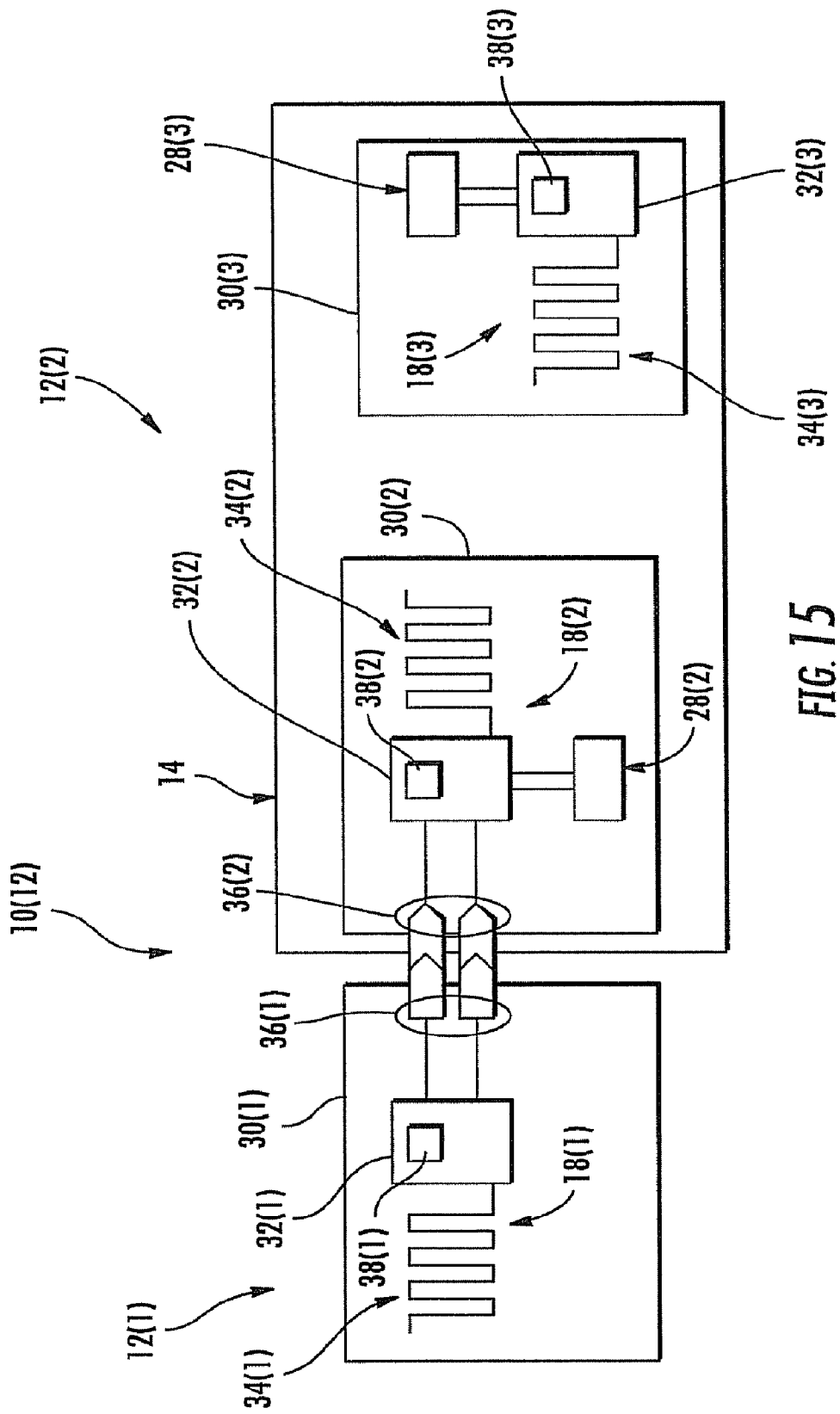
FIG. 15 is a schematic diagram of another exemplary component mating system, and further comprising an additional RFID-enabled IC chip and sensor in the mating component.

FIG. 15 illustrates another exemplary embodiment of a component mating system 10(12) wherein two components 12(1), 12(2) are again mated to each other. The component mating system 10(12) is essentially the same configuration and arrangement as the component mating system 10(2) of FIG. 4, except that an additional IC chip 32(3) provided in an RFID transponder 18(3) is provided as part of the mating component 12(2). The additional RFID transponder 18(3) is provided in a component housing 30(3), which is included in the same article of manufacture 14 as component housing 30(2) in this embodiment. The additional IC chip 32(3) is RFID-enabled and contains essentially the same configuration and components as the RFID transponder 18(2), except that the IC chip 32(3) of RFID transponder 18(3) is not coupled to the electrical leads 36(1), 36(2). Thus, the RFID transponder 18(3) does not exchange identity information with the component 12(1) via the electrical leads 36(1). However, the IC chip 32(3) in RFID transponder 18(3) can receive sensor data from its sensor 28(3) and communicate the sensor data along with its identity information stored in memory 38(3) to the RFID reader 20. In this manner, the RFID reader 20 can associate the sensor data with the mating component 12(2) and with the sensor data from sensor 28(2). If the location of the mating component 12(2) is known, the sensor data from both sensors 28(2), 28(3) can be associated with the location to be location-specific sensor data. Further, because the identity information of the component 12(1) is communicated to the RFID transponder 18(2) when connected to the mating component 12(2), the identity information of the component 12(1) can be associated with the sensor data from sensors 28(2), 28(3) and the location of the mating component 12(2), if known.

Providing an additional RFID transponder 18(3) can serve as a backup function in case the RFID transponder 18(2) and/or antenna 34(2) becomes inoperable, so that sensor data relating to the mating component 12(2) can still be reported to the RFID reader 20. The additional RFID transponder 18(3) may be dedicated to sensing of sensor data from the sensor 28(3) and/or data logging while the RFID transponder 18(2) is dedicated to receiving sensor data from sensor 28(2) and communicating with a component 12(1). The RFID transponders 18(2), 18(3) may also be configured to communicate with each other to exchange information via communications with the RFID reader 20 when it is impractical or impossible to provide a direct electrical communication link between the IC chips 32(2), 32(3) of the RFID transponders 18(2), 18(3). Further, the RFID reader 20 can check the sensor data from both sensors 28(2), 28(3) against each other as a redundancy feature and to ensure no discrepancies exist indicative of a failure in the mating component 12(2). All other functionalities and possibilities that exist for the component mating systems 10(2) of FIG. 4 exist for the component mating system 10(12) of FIG. 15 and thus will not be repeated here.

Figure 16:
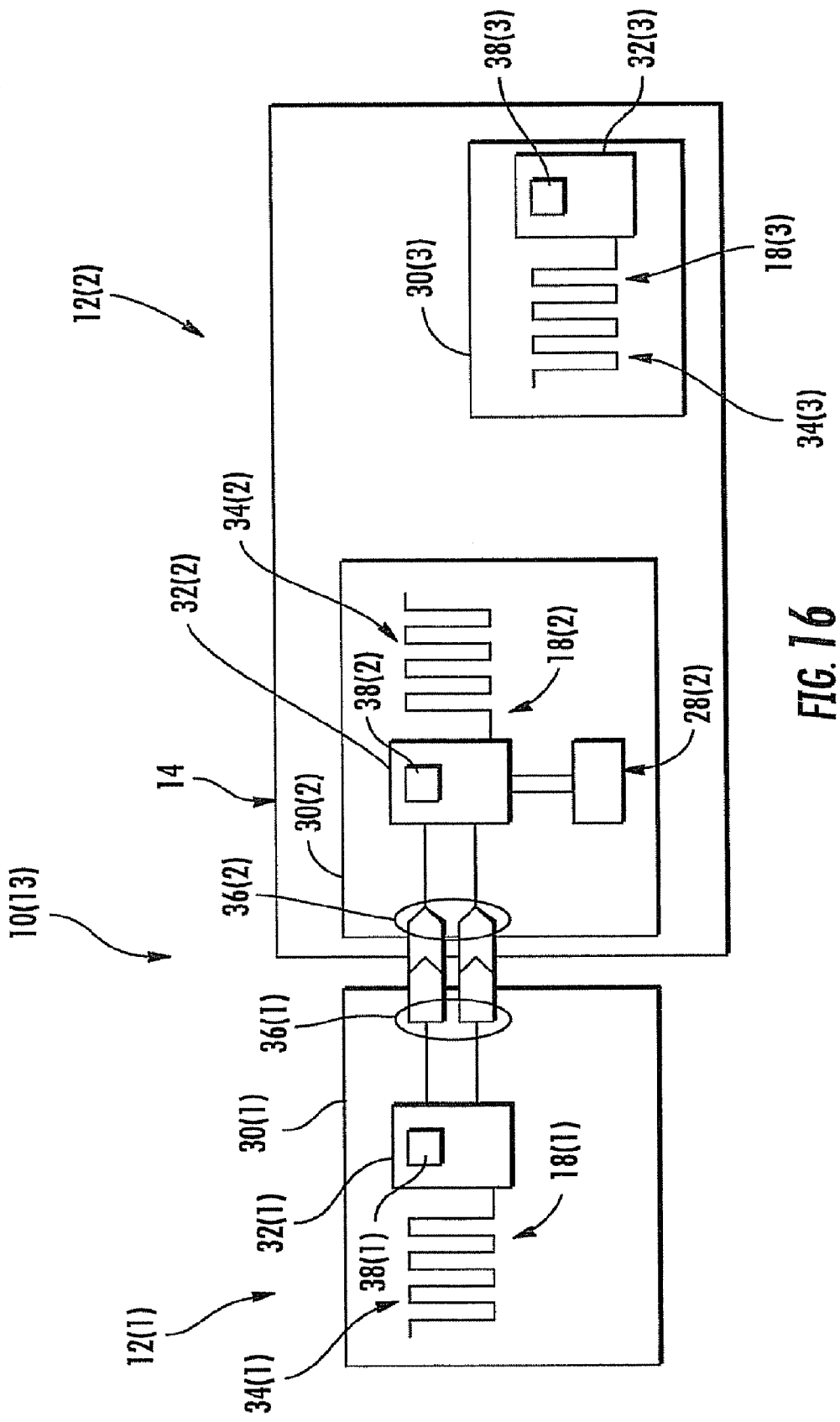
FIG. 16 is a schematic diagram of another exemplary component mating system, and further comprising an additional RFID-enabled IC chip that is not coupled to a sensor.

If the additional sensor 28(3) is not needed or desired, or if a third party transponder is provided as part of the mating component 12(2) that does not contain the additional sensor 28(3), a component mating system 10(13) like that illustrated in FIG. 16 can be provided. The component mating system 10(13) in FIG. 16 is essentially the same configuration and arrangement as provided in the component mating system 10(12) of FIG. 15, except that the additional RFID transponder 18(3) is not coupled to a sensor and thus cannot provide sensor data to the RFID reader 20. The component mating system 10(13) in FIG. 16 may be useful if an additional identity system is desired to be provided on the mating component 12(2), wherein the same or other identity information regarding the mating component 12(2) can be provided to the RFID reader 20. For example, some customers may want to have an additional identity tracking system provided on the mating components 12(2). Also, immediately prior to installation of the mating component 12(2), a handheld RFID reader 20 may be used to interrogate the additional RFID transponder 18(3). Once the additional RFID transponder 18(3) is interrogated, its extracted identity information can be loaded into the component management system 26 where it is associated with the identity information of the RFID transponder 18(2), which may be added at a later time to the mating component 12(2). Alternatively, the identity information from the additional RFID transponder 18(3) may be written directly into the memory 38(2) of the IC chip 32(2) of RFID transponder 18(2).

Figure 17:
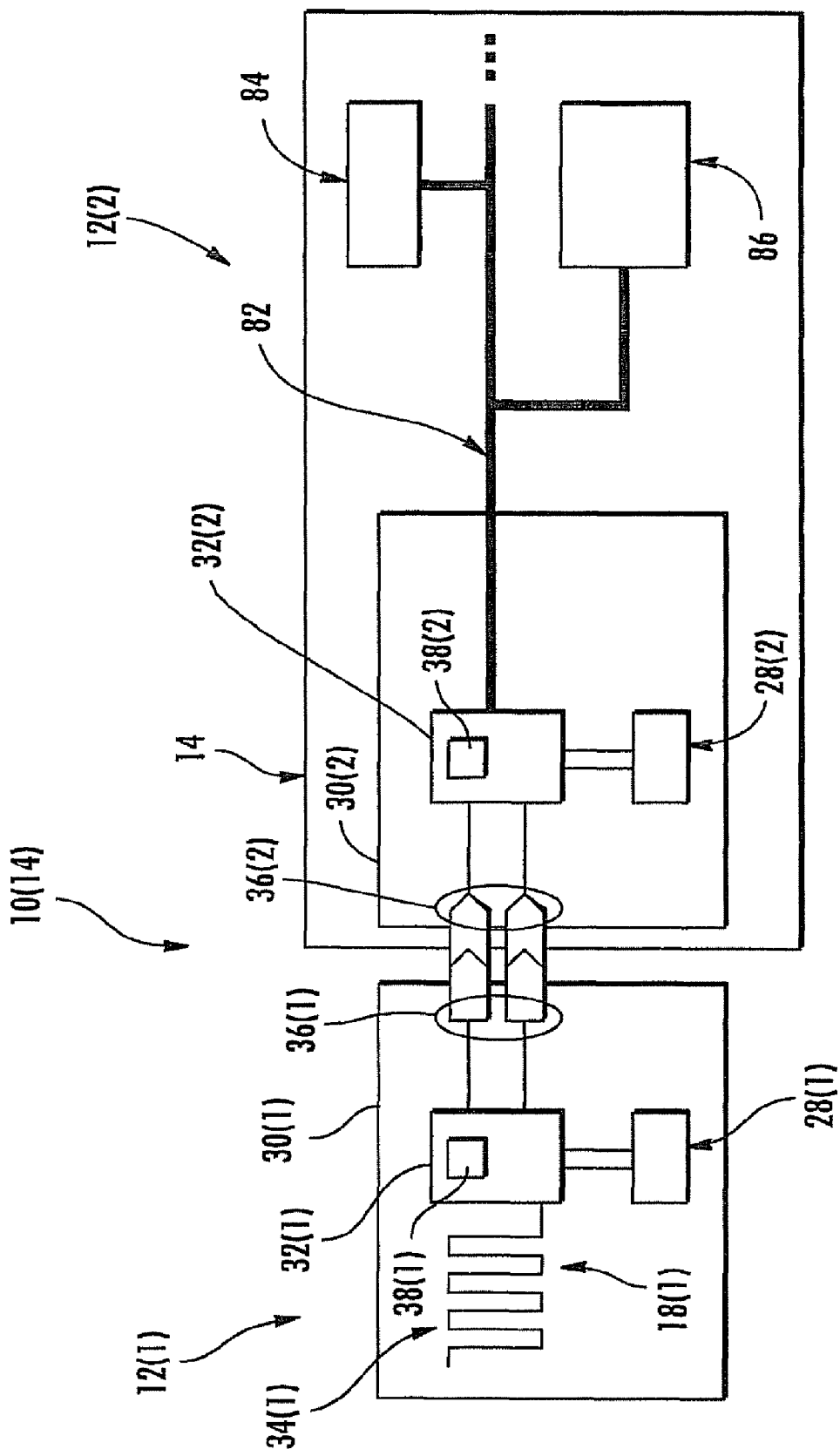
FIG. 17 is a schematic diagram of another exemplary component mating system, and further comprising an $I^2C$ communication bus and control system for the mating component.

FIG. 17 illustrates another exemplary embodiment of a component mating system 10(14) wherein two components 12(1), 12(2) are again mated to each other. The component mating system 10(14) is essentially the same configuration and arrangement as the component mating system 10(11) of FIG. 14, except that the RFID transponder 18(1) is included like the component mating system 10(1) of FIG. 1. The IC chip 32(2) is not RFID-enabled. Further, a bi-directional communication bus 82 is provided and coupled to the IC chip 32(2) such that digital commands can be sent to the IC chip 32(2) over the communication bus 82 to control functions of the IC chip 32(2).

In this embodiment, the communication bus 82 is an Inter-IC® ($I^2C$) communication bus that follows the $I^2C$ protocol; however, any type of bus and communication protocol is possible. In this embodiment, the IC chip 32(2) incorporates an $I^2C$ interface that allows communication over the communication bus 82. Two additional ICs 84, 86 are provided that each contain circuitry or logic and an $I^2C$ interface and can communicate on the communication bus 82 with each other and the IC chip 32(2). Since an $I^2C$ communication bus is a multi-master bus, any of the IC chip 32(2) and the ICs 84, 86 can control the bus by initiating data transfer. However, one IC 84 is designated as the master controller, wherein the IC chip 32(2) and other IC 86 are considered slave controllers. Providing additional ICs 84, 86 in the mating component 12(2) may alleviate the IC chip 32(2) from having to include complex functionality that is desired. The additional functionality can be moved to the other ICs 84, 86. Further, if the mating component 12(2) includes a wired interface to the article of manufacture 14, the ICs 84, 86 may provide that interface so that identity information and/or sensor data can be communicated over wired communications, including on the communication bus 82, rather than limiting communications to the RF communications to the RFID reader 20.

Figure 18:
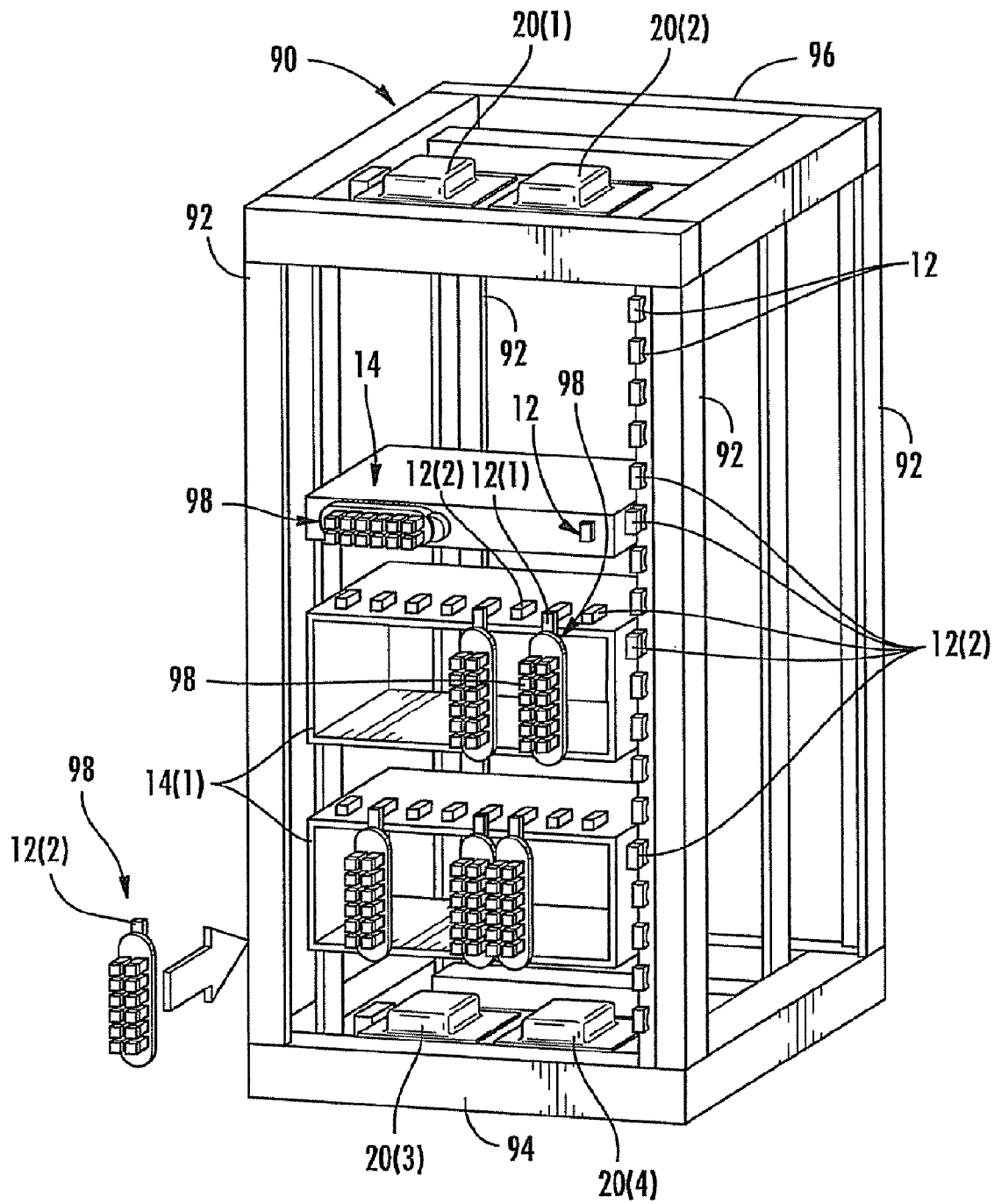
FIG. 18 is an exemplary equipment rack housing providing an RFID reader system for component equipment.

FIG. 18 illustrates another application of the embodiments and the components 12 disclosed herein. In this example, the components 12 are included in articles of manufacture 14 in the form of equipment 14(1) mounted in an equipment rack 90 as well as the equipment rack 90 itself. Components 12 can be placed anywhere on the equipment rack 90 or equipment 14(1) installed in the equipment rack 90, as shown. In this manner, environmental and/or physical information can be sensed regarding the equipment rack 90 and its surrounding area as well as the equipment 14(1) via sensors, and the sensor data can be localized to a location to be location-specific.

The equipment 14(1) may be electrical or fiber optic equipment as examples, and may include patch panels for a network or other types of equipment, including a router or a server, as examples. As illustrated in FIG. 18, the equipment rack 90 is typically comprised of a plurality of vertical rails 92 extending between a base 94 and a top area 96 to form an enclosure. RFID readers 20(1)-20(4) as part of an RFID reader system 22, like previously described in the aforementioned embodiments, may be located at the base 94 and/or top areas 96 to interrogate components 12 in the equipment 14(1) installed in the equipment rack 90. The equipment rack 90 contains a series of slots to allow equipment 14(1) to be mounted therein and for proper air flow to occur between the equipment 14(1). The equipment may contain one or more patch panels or modules 98 that contain fixed mating components 12(2), which may be configured according to one or more of the embodiments of components 12 previously described. The patch panels 98 may be arranged in any orientation desired in the equipment 14(1), including but not limited to either a horizontal or vertical orientation.

Components 12 can be placed on the equipment rack 90 in known locations to sense information regarding environment and/or physical conditions. Also, when a removable component 12(1) is connected to a fixed component 12(2), a connection condition event is triggered such that the IC chips 32(1), 32(2), RFID-enabled or not, or a combination of each, and/or other components coupled to electrical leads 36(1), 36(2), like shown in FIGS. 2 and 3, are coupled to other to allow exchange of information, including but not limited to identity information, sensor data, and other information that may be stored or displayed relating to the components 12 and/or their environment. Additional components 12, which may be RFID-enabled, may be located along the vertical rails 92 and on the equipment 14(1) itself, respectively, at various interconnection locations to sense environmental and/or physical information regarding the equipment 14(1) or equipment rack 90, or surrounding areas, wherein the sensor data and/or identity information can be exchanged between the mated components 12(2) and/or communicated to the RFID readers 20(1)-20(4) just as provided for the components 12(1), 12(2) according to any of the component embodiments previously described. The component 12 may be attached to equipment 14(1) and thus removable when the equipment 14(1) is removed from the equipment rack 90. When the equipment 14(1) is installed, the component 12(1) can be configured to mate with the fixed component 12(2) installed on the vertical rail 92 to establish a communication, which can include any of the configurations and functions according to any of the previously described component 12 embodiments. Further, the equipment may also contain additional components 12(1) installed on patch panels 98 that are configured to mate with components 12(2) installed on the equipment 14 when the patch panels 98 are installed, wherein the components 12(1), 12(2) establish communication to each, and which can include any of the configurations and functions according to any of the previously described component 12 embodiments.

The disclosed technologies can be configured in different ways, resulting in different functionalities. In addition to the examples provided above, the components may be located on a plug (such as a connector), a socket (such as an adapter), a housing, a cabinet, an equipment rack, a component or patch panel, a separate object, or other components (or portions thereof). The sensors may be responsive to detect one or more conditions and/or changes in environmental and/or physical conditions.

Although FIG. 18 provides an example of components associated with electrical and/or optical equipment, component assemblies, and cables in which RFID and sensor technologies are employed, wherein the sensor data from sensors can be associated with various interconnection points and locations, the components disclosed herein can be associated with any type of articles of manufacture for any type of application. For example, the components with sensors, RFID-enabled or not, can be integrated at or near various interconnection locations and articles of manufacture along an electrical or optical network, at or near various interconnection locations along a utility distribution system, such as distribution systems dedicated to energy (e.g., electric power, oil, natural gas), information (telephone, cable, DSL or internet access) or water and sewer service. This network can be incorporated into any system, such as an automobile electrical harness; an optical network for an airplane, ship or ground-based transportation system; a control network for railroad switchgear; or a LAN integrated into a building. The components with sensors can also be integrated at or near various interconnection locations and articles of manufacture along a utility distribution system, such as distribution systems dedicated to energy (e.g., electric power, oil, natural gas), information (telephone, cable, DSL or internet access) or water and sewer services. The components could be temporarily installed networks and interconnection systems and articles of manufacture such as fire hoses, sports or performance events, or power and communications networks associated with military deployment. Other applications include specific locations across a two-dimensional (2D) array of panels, examples of which include floor tiles with temperature or pressure sensors for building security or environmental control, ceiling tiles with integrated motion or fire sensors, or load sensors integrated into modular sections that are assembled to create floors, roofs, roads or bridges.

It should also be understood that elements of the embodiments below may be mixed in different ways to achieve still further embodiments and functionality within the scope of the embodiments herein.

Any functionalities disclosed in any embodiments may be incorporated or provided in any other embodiments with suitable circuitry and/or devices. Although the illustrated embodiments are directed to components, wherein RFID-enabled versions of the components, including ICs and IC chips, employ passive RFID transponders, further embodiments include one or more semi-passive or active RFID transponders depending upon the particular functionality of the RFID transponder system desired.

Although the embodiments described herein are directed to components used with components in general, the embodiments are applicable to any type of component. Examples include fiber optic connectors and adapters or copper connectors and adapters and other fiber optic and/or copper components. Embodiments disclosed herein can be used in non-telecommunications equipment, particularly regarding components that interconnect and/or are exposed to various conditions for which it is desirable to know the location, connectivity, and/or conditions of the components. The terms "plug" and "socket" are generally used herein to define portions of components that are adapted for connecting to one another, such as a connector that is received by an adapter, and are not necessarily limited to standard plugs and sockets.

Many modifications and other embodiments set forth herein will come to mind to one skilled in the art to which the embodiments pertain having the benefit of the teachings presented in the foregoing descriptions and the associated drawings.

Therefore, it is to be understood that the description and claims are not to be limited to the specific embodiments disclosed and that modifications and other embodiments are intended to be included within the scope of the appended claims. It is intended that the embodiments cover the modifications and variations of these embodiments provided they come within the scope of the appended claims and their equivalents. Although specific terms are employed herein, they are used in a generic and descriptive sense only and not for purposes of limitation.

What is claimed is:

1. A component system, comprising:
   an integrated circuit (IC);
   one or more electrical leads; and
   one or more sensors coupled to the IC configured to provide sensor data;
   wherein the IC is configured to communicate with a second IC in a mating component when the one or more electrical leads are coupled to one or more electrical leads on the mating component to associate the sensor data with identity information of the mating component; and
   wherein the one or more sensors are coupled to the IC, the second IC, or both the IC and the second IC;
   a third IC electrically coupled to the second IC; and
   a second one or more sensors coupled to the third IC and configured to communicate second sensor data to the third IC;
   wherein the third IC is configured to communicate the second sensor data to the second IC.

2. The component system of claim 1, wherein the IC is configured to communicate the sensor data over the one or more electrical leads to the mating component to associate the sensor data with the identity information of the mating component.

3. The component system of claim 1, wherein the IC is configured to receive the identity information of the mating component over the one or more electrical leads to associate the sensor data with the identity information of the mating component.

4. The component system of claim 1, wherein the IC is RFID-enabled and coupled to an antenna to provide an RFID-transponder configured to communicate to an RFID reader.

5. The component system of claim 4, wherein the RFID transponder is configured to communicate the sensor data to the RFID reader.

6. The component system of claim 4, wherein the RFID transponder is configured to:
   receive the identity information of the mating component over the one or more electrical leads to associate the sensor data with the identity information of the mating component; and
   communicate the identity information of the mating component to the RFID reader.

7. The component system of claim 4, further comprising a power supply configured to supplementally power the RFID transponder.

8. The component system of claim 1, further comprising:
   a second IC electrically coupled to the IC; and
   a second one or more sensors coupled to the second IC and configured to communicate second sensor data relating to the component to the second IC;
   wherein the second IC is configured to communicate the second sensor data to the IC.

9. The component system of claim 8, wherein the IC is RFID-enabled and is coupled to an antenna to provide an RFID transponder configured to communicate either the sensor data, the second sensor data, or both the sensor data and the second sensor data to an RFID reader.

10. The component system of claim 8, wherein the second IC is RFID-enabled and is coupled to a second antenna to provide a second RFID transponder;
    wherein the IC is configured to communicate the sensor data to the second RFID transponder.

11. The component system of claim 10, wherein the second RFID transponder is configured to communicate either the sensor data, the second sensor data, or both the sensor data and the second sensor data to an RFID reader.

12. The component system of claim 10, wherein the second RFID transponder is configured to:
    receive the identity information of the mating component; and
    communicate the identity information of the mating component to the RFID reader.

13. The component system of claim 8, wherein the IC is RFID-enabled and is coupled to an antenna to provide an RFID transponder and the second IC is RFID-enabled and is coupled to a second antenna to provide a second RFID transponder;
    wherein the RFID transponder is configured to communicate the sensor data over the antenna to the second RFID transponder via the second antenna.

14. The component system of claim 1, wherein the mating component further comprises one or more second electrical leads coupled to the second IC;
    wherein the IC and the second IC are configured to communicate with each other when the one or more electrical leads are coupled to the one or more second electrical leads.

15. The component system of claim 1, wherein the second IC is RFID-enabled and is coupled to an antenna to provide a second RFID transponder.

16. The component system of claim 15, wherein the second RFID transponder is configured to communicate the sensor data to an RFID reader.

17. The component system of claim 15, wherein the second RFID transponder is configured to communicate the identity information of the mating component to an RFID reader.

18. The component system of claim 1, wherein the third IC is RFID-enabled and is coupled to a third antenna to provide a third RFID transponder;
    wherein the second IC is configured to communicate the sensor data to the third RFID transponder.

19. The component system of claim 1, wherein the IC is further configured to receive power from the one or more electrical leads on the mating component.

20. The component system of claim 1, wherein the IC includes a communication bus interface and is configured to exchange information over a communication bus.

21. The component system of claim 1, further comprising a display coupled to the IC, wherein the IC is configured to communicate information regarding the component to the display.

22. The component system of claim 21, wherein the display is comprised from the group consisting of a light emitting diode (LED), an alpha display, a numeric display, an alpha-numeric display, a liquid crystal display (LCD), and an electroluminescent display.

23. The component system of claim 1, wherein the one or more sensors are comprised of one or more from the group consisting of a temperature sensor, a pressure sensor, a humidity sensor, a movement sensor, a proximity sensor, a voltage sensor, a current sensor, a power sensor, a mechanical strain sensor, an impact sensor, a biological sensor, a contact closure sensor, a shock sensor, an audible sensor, a stress sensor, a wavelength sensor, a signal strength sensor, a phase shift sensors, an impedance sensor, a shock sensor, an input voltage standing wave ratio (VSWR) sensor, a signal quality sensor, an orientation sensor, a light level sensor, a contact sensor, and a flow sensor.

24. The component system of claim 1, further comprising equipment comprised from the group consisting of fiber optic equipment, electrical equipment, power equipment, computer equipment, vehicle equipment, aviation equipment, network equipment, storage equipment, routing equipment, and telephony equipment in which the mating component is included to which the component is configured to connect.

25. A method for determining the location of sensor data regarding a component, comprising:
    sensing data relating to a component via one or more sensors;
    communicating the sensor data from one or more sensors to an integrated circuit (IC); and
    associating the sensor data with identity information of a mating component when one or more electrical leads coupled to the IC are connected to one or more electrical leads coupled to a second IC of the mating component;
    sensing second data relating to the mating component via a second one or more sensors;
    communicating the second sensor data to a third IC; and
    communicating the second sensor data from the third IC to the second IC.

26. The method of claim 25, wherein associating the sensor data comprises communicating the sensor data over the one or more electrical leads to the mating component to associate the sensor data with the identity information of the mating component.

27. The method of claim 25, wherein associating the sensor data comprises receiving the identity information of the mating component over the one or more electrical leads to associate the sensor data with the identity information of the mating component.

29. The method of claim 25, further comprising the IC communicating identity information of the mating component via radio-frequency (RF) communications to an RFID reader.

28. The method of claim 25, further comprising the IC communicating the sensor data via radio-frequency (RF) communications to an RFID reader.

* * * * *